(12) United States Patent
Awano et al.

(10) Patent No.: US 10,498,389 B2
(45) Date of Patent: Dec. 3, 2019

(54) ECHO CANCELLER DEVICE AND VOICE TELECOMMUNICATIONS DEVICE

(71) Applicant: Mitsubishi Electric Corporation, Tokyo (JP)

(72) Inventors: Tomoharu Awano, Tokyo (JP); Satoru Furuta, Tokyo (JP); Jun Ishii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 15/774,653

(22) PCT Filed: Nov. 16, 2015

(86) PCT No.: PCT/JP2015/082110
§ 371 (c)(1),
(2) Date: May 9, 2018

(87) PCT Pub. No.: WO2017/085761
PCT Pub. Date: May 26, 2017

(65) Prior Publication Data
US 2018/0331719 A1    Nov. 15, 2018

(51) Int. Cl.
*H04B 3/23*    (2006.01)
*H04M 1/60*    (2006.01)
(Continued)

(52) U.S. Cl.
CPC .............. *H04B 3/234* (2013.01); *H04B 3/23* (2013.01); *H04B 3/237* (2013.01); *H04M 1/60* (2013.01);
(Continued)

(58) Field of Classification Search
CPC .......... H04B 3/234; H04B 3/237; H04B 3/23; H04M 9/08; H04M 9/082; H04M 1/60; G10K 11/002
See application file for complete search history.

(56) References Cited

U.S. PATENT DOCUMENTS 5,463,618 A * 10/1995 Furukawa .............. H04B 3/234
                                                              370/290
2003/0219113 A1* 11/2003 Bershad ................... H04B 3/23
                                                              379/406.01
2011/0019831 A1*  1/2011 Liu ....................... H04M 9/082
                                                              381/66

FOREIGN PATENT DOCUMENTS

JP       6-338827 A       12/1994
WO    WO 03/101004 A1    12/2003

OTHER PUBLICATIONS

Fujii et al., "Double-Talk Detection Method with Detecting Echo Path Fluctuation", IEICE Transactions (A), vol. J78-A, No. 3, Mar. 1995, pp. 314-322.

(Continued)

*Primary Examiner* — Jae Y Lee
(74) *Attorney, Agent, or Firm* — Birch, Stewart, Kolasch & Birch, LLP

(57) ABSTRACT

Disclosed is an echo canceller (10) including: a false echo calculator (32) that acquires current and previous filter-coefficient groups used by an adaptive filtering unit (20), and that calculates plural false echo signals by performing a filtering operation using each of the current and previous filter-coefficient groups on a sequence of reception signals (x(n)); a voice-transmission signal buffer that outputs a previous voice-transmission signal (y(n−1)); an evaluation value calculator (34) that calculates plural evaluated values of an echo cancellation quantity by using the previous voice-transmission signal; a filter selector (36) that selects a (Continued)

new filter-coefficient group on the basis of the plural evaluated values of the echo cancellation quantity; a foreground filter (39) that performs a filtering operation using the new filter-coefficient group on the sequence of reception signals (x(n)) to generate an estimated echo component; and a subtractor (25) that subtracts the estimated echo component from a voice-transmission signal to generate a residual signal (e(n)).

18 Claims, 12 Drawing Sheets

(51) Int. Cl.
      *H04M 9/08*       (2006.01)
      *G10K 11/00*     (2006.01)
(52) U.S. Cl.
      CPC ............. *H04M 9/08* (2013.01); *H04M 9/082* (2013.01); *G10K 11/002* (2013.01)

(56) References Cited

OTHER PUBLICATIONS

Gustafsson et al. "A Psychoacoustic Approach to Combined Acoustic Echo Cancellation and Noise Reduction", IEEE Transactions on Speech and Audio Processing, vol. 10, No. 5, Jul. 2002, p. 245-256.
Ochiai et al., "Echo Canceler with Two Echo Path Models", IEEE Transactions on Communications, vol. COM-25, No. 6, Jun. 1977, pp. 589-595.

\* cited by examiner

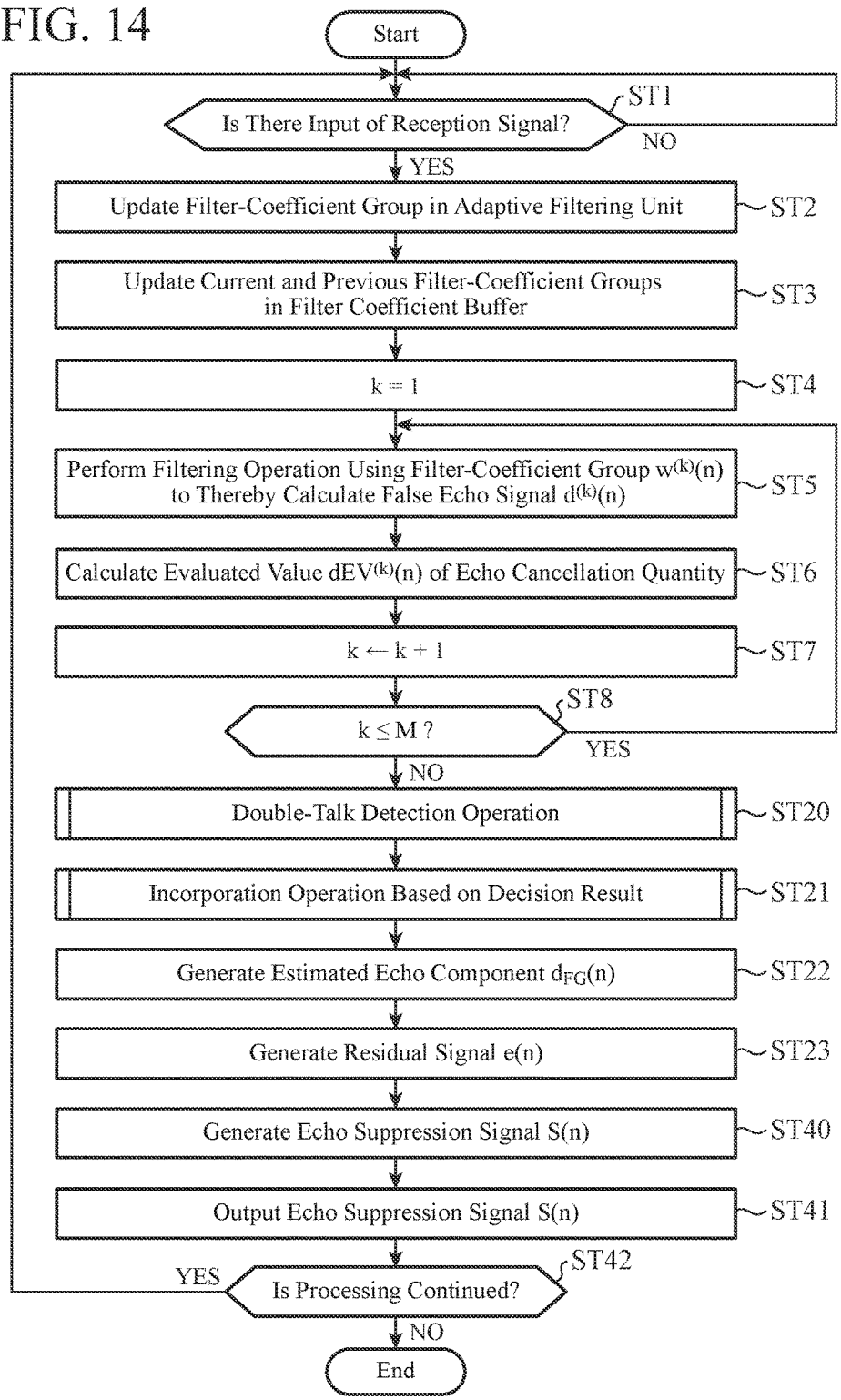

ECHO CANCELLER DEVICE AND VOICE TELECOMMUNICATIONS DEVICE

CROSS REFERENCE TO RELATED APPLICATIONS

This application is the National Phase of PCT/JP2015/082110 filed on Nov. 16, 2015, which is hereby expressly incorporated by reference into the present application.

TECHNICAL FIELD

The present invention relates to an echo-cancellation technique for reducing acoustic echo components included in an acoustic signal detected by a microphone, and more particularly to an echo-cancellation technique for reducing acoustic echo components by using an adaptive filter.

BACKGROUND ART

When bidirectional communications are carried out between two voice telecommunications devices each having a microphone and a speaker, a sound (e.g., a sender's voice or background noise) collected by a microphone of one of the voice telecommunications devices is played back by a speaker of the other voice telecommunications device on the other end of the communication after being transmitted via an electrical communication network to the other voice telecommunications device. However, when the played-back sound goes around from the speaker directly or indirectly to the microphone and is collected, the played-back sound is returned to the voice telecommunications device which is the transmission source. Such a played-back sound returned to the voice telecommunications device which is the transmission source is called the "acoustic echo."

As a device that suppresses an acoustic echo, an echo canceller which employs an adaptive filter is used widely. In this type of echo canceller, an adaptive filter successively estimates, i.e., learns the characteristics of a transmission path (also referred to as an "echo path" hereafter) via which an acoustic echo travels from a speaker to a microphone, and generates a false echo signal (also referred to as an "echo replica"). Then, by removing the false echo signal from a voice-transmission signal to be transmitted to the voice telecommunications device which is the transmission source, the acoustic echo component included in the voice-transmission signal can be reduced. Therefore, it can be said that the performance of the adaptive filter determines the echo cancellation performance of the echo canceller.

As a cause of an impediment to such the learning of the echo path characteristics which is carried out by the adaptive filter, there can be considered mixing of a disturbance signal into an acoustic signal detected by the microphone. For the adaptive filter, a near end speaker's voice or background noise which is mixed into an acoustic echo is a disturbance signal, and is an impediment to the learning of the echo path characteristics. Particularly, a double talk state in which a near end speaker's voice and an acoustic echo are mixed into the microphone becomes a problem as a cause of an impediment to the learning of the echo path characteristics.

As a measure against the above-mentioned problem resulting from a double talk, an echo canceller including an adaptive filter and a double talk detecting circuit for determining the presence or absence of a double talk is known. This type of echo canceller is disclosed by, for example, Non-patent Literature 1 listed below. An acoustic echo canceller disclosed by Non-patent Literature 1 includes a double talk detecting circuit that monitors the amount of echo cancellation as a detection parameter, and that, when the amount of echo cancellation becomes equal to or larger than a predetermined amount, determines that a double talk has occurred and stops updating of an adaptive filter coefficient.

Further, an echo canceller that in order to improve the robustness against a disturbance signal of the learning of the echo path characteristics, includes two types of filters is also known. This type of echo canceller is disclosed by, for example, Non-patent Literature 2 listed below. The echo canceller disclosed by Non-patent Literature 2 includes a background (BG) filter that learns the echo path characteristics, and a foreground (FG) filter in which a result of the learning carried out by the BG filter is reflected over a certain period of time, and uses the FG filter for echo cancellation.

An echo canceller including two types of filters and a double talk detecting circuit is disclosed by Patent Literature 1 (Japanese Patent Application Publication No. 1994 (H06)-338827).

CITATION LIST

Patent Literature

Patent Literature 1: Japanese Patent Application Publication No. 1994 (H06)-338827 (for example, see FIG. 1 and paragraphs [0014] to [0020])

Non-Patent Literatures

Non-Patent Literature 1: Kensaku FUJII, and Juro OHGA, "Double-Talk Detection Method with Detecting Echo Path Fluctuation," IEICE Transactions (A), vol. J78-A, no. 3, pp. 314-322, March 1995.

Non-Patent Literature 2: K. Ochiai, T. Araseki, and T. Ogihara, "Echo canceller with two echo path models," IEEE Transactions on Communications, vol. COM-25, no. 6, pp. 589-595, June 1977.

SUMMARY OF INVENTION

Technical Problem

In a conventional echo canceller including such a double talk detecting circuit as above, there is a case in which the amount of echo cancellation extremely decreases when an adaptive filter carries out erroneous learning as a result of erroneous determination carried out by the double talk generating circuit. Further, in a conventional echo canceller including such two types of filters as above, there is a case in which the robustness against a disturbance signal cannot be maintained when both the two types of filters carry out erroneous learning as a result of the occurrence of a double talk. Therefore, the above-mentioned conventional echo cancellers do not necessarily provide echo cancellation performance which is stable under an environment in which a double talk occurs.

In view of the foregoing, it is an object of the present invention to provide an echo canceller device and voice telecommunications device that can maintain echo-suppression performance which is stable under an environment where a double talk occurs.

Solution to Problem

According to a first aspect of the present invention, there is provided an echo canceller device which includes: an adaptive filtering unit configured to perform a filtering operation using a filter-coefficient group on a reception signal sequence input thereto, and to update the filter-coefficient group on the basis of a voice-transmission signal input thereto from a sound collector; a false echo calculator configured to acquire current and previous filter-coefficient groups which have been used by the adaptive filtering unit, and to perform filtering operations using the current and previous filter-coefficient groups, respectively, on the input reception signal sequence to thereby calculate false echo signals; a voice-transmission signal buffer configured to output, as a previous voice-transmission signal, a voice-transmission signal input thereto from the sound collector, after temporarily storing the voice-transmission signal; an evaluation value calculator configured to calculate evaluated values of an echo cancellation quantity corresponding to the respective false echo signals on the basis of the previous voice-transmission signal and the false echo signals; a filter selector configured to select a new filter-coefficient group from among the current and previous filter-coefficient groups on the basis of the evaluated values of the echo cancellation quantity; a foreground filter configured to performs a filtering operation using the new filter-coefficient group on the input reception signal sequence to thereby generate an estimated echo component; and a subtractor configured to subtract the estimated echo component from a voice-transmission signal input thereto from the sound collector, to thereby generate a residual signal.

According to a second aspect of the present invention, there is provided an echo canceller device which includes: an adaptive filtering unit configured to perform a filtering operation using a filter-coefficient group on a reception signal sequence input thereto, and to adaptively update the filter-coefficient group on the basis of a voice-transmission signal input thereto from a sound collector; a reception signal buffer configured to output, as a previous reception signal sequence, the input reception signal sequence, after temporarily storing the reception signal sequence; a false echo calculator configured to acquire current and previous filter-coefficient groups which have been used by the adaptive filtering unit, and configured to perform a filtering operation using the current filter-coefficient group on the previous reception signal sequence to thereby calculate a first false echo signal, and to perform a filtering operation using the previous filter-coefficient group on the previous reception signal sequence to thereby calculate a second false echo signal; a voice-transmission signal buffer configured to output, as a previous voice-transmission signal, a voice-transmission signal input thereto from the sound collector, after temporarily storing the voice-transmission signal; an evaluation value calculator configured to calculate a first evaluated value of an echo cancellation quantity on the basis of both the first false echo signal and the previous voice-transmission signal input thereto from the voice-transmission signal buffer, and to calculate a second evaluated value of the echo cancellation quantity on the basis of both the second false echo signal and the previous voice-transmission signal; a double-talk detector configured to compare with each other the first and second evaluated values of the echo cancellation quantity to decide whether a double talk occurs; a foreground filter configured to generating an estimated echo component by performing, on the input reception signal sequence, a filtering operation using a filter-coefficient group in which the current filter-coefficient group is incorporated with a degree of incorporation depending on the decision result acquired by the double-talk detector; and a subtractor configured to subtract the estimated echo component from a voice-transmission signal input thereto from the sound collector, to thereby generate a residual signal.

According to a third aspect of the present invention, there is provided a voice telecommunications device which includes: a communication function unit configured to communicate with another voice telecommunications device via an electrical communication network; and the echo canceller device according to the above first or second aspect.

Advantageous Effects of Invention

According to the present invention, echo-cancellation performance which is stable under an environment where a double-talk occurs can be maintained.

BRIEF DESCRIPTION OF DRAWINGS

FIG. 14 is a flow chart schematically showing an example of the procedure of echo cancellation processing according to Embodiment 3.

DESCRIPTION OF EMBODIMENTS

Figure 1:
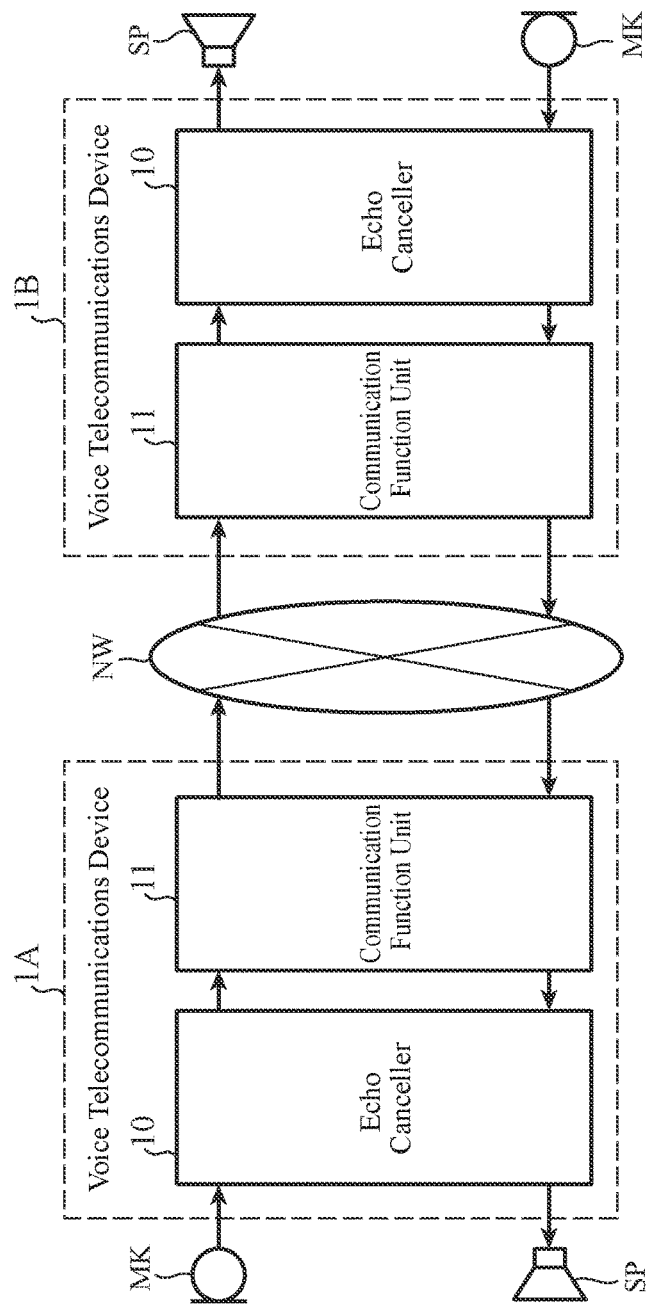
FIG. 1 is a diagram showing the schematic configuration of a communication system in Embodiment 1 according to the present invention.

Hereafter, various embodiments according to the present invention will be explained in detail with reference to drawings. It is assumed that components denoted by the same reference numerals in the whole of the drawings have the same configurations and the same functions.

Embodiment 1

FIG. 1 is a diagram showing the schematic configuration of a communication system including two voice telecommunications devices 1A and 1B each having an echo canceller 10 of Embodiment 1 according to the present invention. As shown in FIG. 1, the two voice telecommunications devices 1A and 1B are connected to each other via a communication line network NW, and have the same configuration. Each of the voice telecommunications devices 1A and 1B is connected to both a sound collecting unit MK including a microphone, and a speaker SP that outputs a played-back sound which is an acoustic wave, and includes a communication function unit 11 that communicates with a voice telecommunications device on the other end of the communication, and an echo canceller 10 that reduces an acoustic echo component in a voice-transmission signal to be transmitted to the voice telecommunications device on the other end of the communication. When the sound collecting unit MK is acoustically coupled to the speaker SP, more specifically, when an acoustic wave outputted by the speaker SP propagates through a medium such as air, a fluid, or a solid, and goes around to the sound collecting unit MK and is detected, the sound collecting unit MK can detect the acoustic wave as an acoustic echo. As the communication line network NW, for example, a wide area network such as a telephone network, a mobile communication network, or the Internet, or a small-scale communication network such as a LAN (Local Area Network) is provided.

Figure 2:
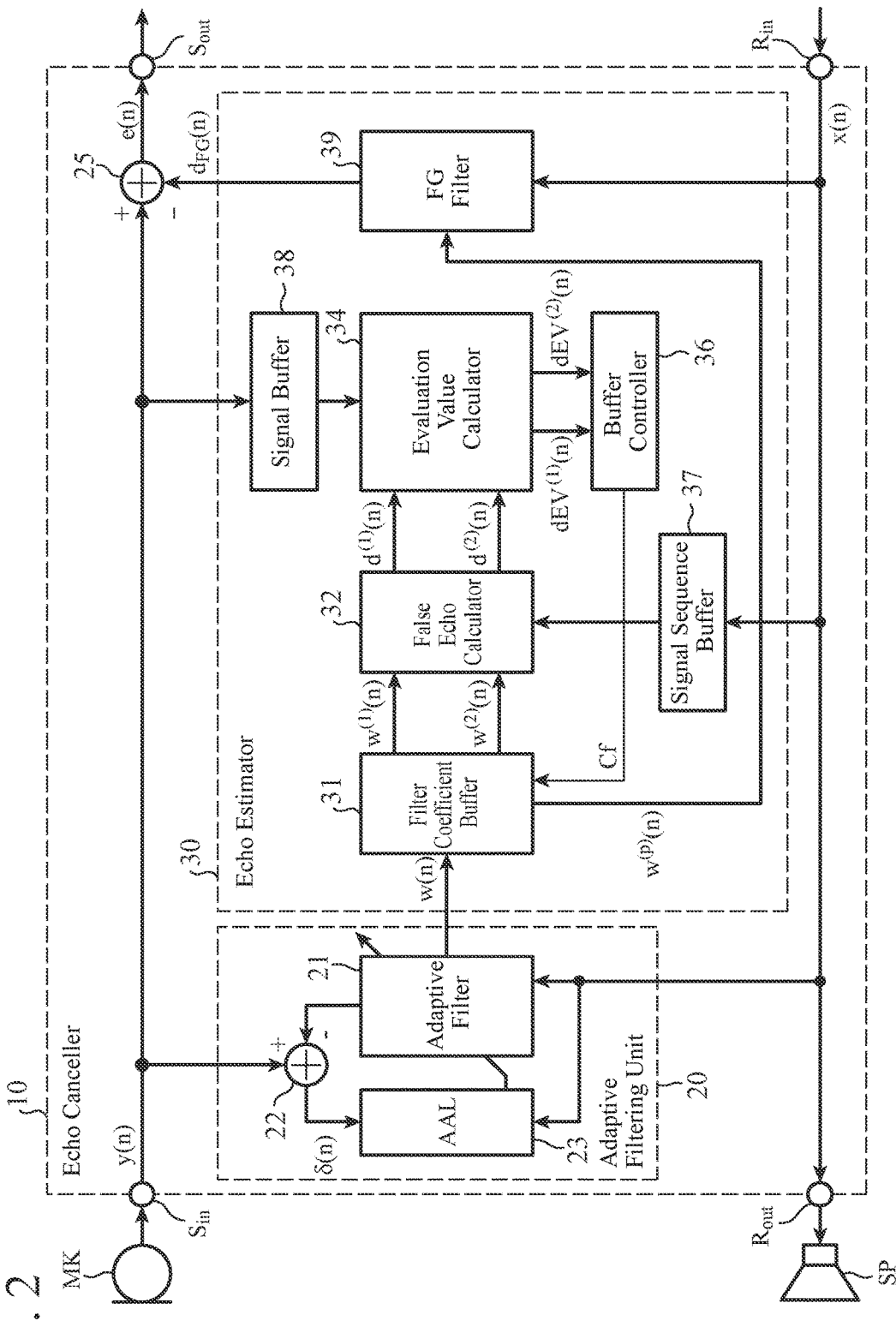
FIG. 2 is a diagram showing a schematic configuration of an echo canceller of Embodiment 1.

FIG. 2 is a block diagram showing the schematic configuration of the echo canceller 10 of Embodiment 1. As shown in FIG. 2, the echo canceller 10 includes a signal input unit $S_{in}$ that samples a acoustic-sensor signal inputted thereto from the sound collecting unit MK, to output a voice-transmission signal y(n), a line side signal output unit $S_{out}$ that outputs a residual signal e(n) which is the voice-transmission signal in which an acoustic echo component is reduced to the communication function unit 11, a line side signal input unit $R_{in}$ to which a reception signal x(n) received by the communication function unit 11 is inputted, and a signal output unit $R_{out}$ that outputs the reception signal x(n) to the speaker SP. All the voice-transmission signal y(n), the reception signal x(n), and the residual signal e(n) are discrete time signals, and n is an integer specifying a discrete sampling time $T_n$.

The echo canceller 10 also includes an adaptive filtering unit 20 that performs a filtering operation using a filter-coefficient group w(n) in a time domain on a sequence of inputted reception signals x(n) (also referred to as a "reception signal sequence" hereafter). This adaptive filtering unit 20 also has a function of adaptively updating the filter-coefficient group w(n) depending on the voice-transmission signal y(n), in accordance with a well-known adaptation algorithm such as an LMS (Least Mean Square) method or an NLMS (Normalized Least Mean Square) method.

The adaptive filtering unit 20 is configured so as to include an adaptive filter 21 that performs a convolution operation on the reception signal sequence and the filter-coefficient group w(n), a subtractor 22 that subtracts a filter output d(n) of this adaptive filter 21 from the voice-transmission signal y(n) to generate an error signal δ(n), and an adaptation algorithm unit (AAL) 23 that adaptively updates the filter-coefficient group w(n) depending on this error signal δ(n), as shown in FIG. 2.

The reception signal sequence X(n) can be expressed by an N-dimensional vector given by the following equation (1).

$$X(n)=[x(n),x(n-1),\ldots,x(n-N+1)]^T \quad (1)$$

In this equation, N is an integer equal to or larger than 3, and a symbol T shows a transposition that transforms a row vector with one row and N columns into a column vector with N rows and one column. The filter-coefficient group w(n) used in the convolution operation can be expressed by an N-dimensional vector given by the following equation (2).

$$w(n)=[w_0(n),w_1(n),\ldots,w_{N-1}(n)]^T \quad (2)$$

The adaptive filter 21 can calculate the filter output d(n) by performing a convolution operation on the reception signal sequence X(n) and the filter-coefficient group w(n) in accordance with the following equation (3).

$$d(n)=\{w(n)\}^T X(n) \quad (3)$$

Further, the subtractor 22 calculates the error signal δ(n) by subtracting the filter output d(n) from the voice-transmission signal y(n), as shown in the following equation (4).

$$\delta(n)=y(n)-\{w(n)\}^T X(n) \quad (4)$$

The adaptation algorithm unit 23 successively corrects the filter-coefficient group w(n) in such a way that the size of the error signal δ(n) is minimized under a predetermined condition. In a case in which a well-known NLMS method which is also called a learning identification method is adopted, the adaptation algorithm unit 23 can derive a new filter-coefficient group w(n+1) in accordance with the following equation (5).

$$w(n+1)=w(n)+\mu(n-1)\cdot e(n-1)\cdot X(n-1) \quad (5)$$

In this equation, μ(n−1) is a coefficient at a sampling time $T_{n-1}$, and, for example, is given by the following equation (6).

$$\mu(n-1) = \frac{\alpha}{N\sigma_x + \beta} \cong \frac{\alpha}{\{X(n-1)\}^T X(n-1) + \beta} \quad (6)$$

In this equation, α is a step size for adjusting the update amount for the filter-coefficient group, and β is a very small number preventing the denominator of the middle expression of the equation (6) from becoming zero. Further, N is equal to the filter length of the adaptive filter 21, and $\sigma_x$ is a variance of the reception signal. In addition, $N\sigma_x$ can be approximated by the square of the norm of a reception signal sequence X(n−1): $\|X(n-1)\|^2 (=\{X(n-1)\}^T \cdot X(n-1))$.

The adaptation algorithm unit 23 then updates the filter-coefficient group w(n) by replacing the current-time filter-coefficient group w(n) in the adaptive filter 21 with the new filter-coefficient group w(n+1). Because the filter-coefficient group w(n) indicates an estimated amount of the characteristics of an echo path extending from the speaker SP to the sound collector MK, the successive updates of the filter-coefficient group w(n) means that successive estimations of the echo path characteristics, i.e., learning of the echo path characteristics is carried out. The adaptation algorithm is not limited to an LMS method and an NLMS method. For example, the configuration of the adaptive filtering unit 20 can be modified suitably in such a way that the adaptive filtering unit operates in accordance with another adaptation algorithm such as an affine projection method or an RLS (Recursive Least Square) method.

Next referring to FIG. 2, the echo canceller 10 includes an echo estimator 30 that calculates an estimated echo component $d_{FG}(n)$. This echo estimator 30 is configured so as to include a filter coefficient buffer 31, a false echo calculator 32, an evaluation value calculator 34, a buffer controller 36, signal buffers 37 and 38, and an FG (foreground) filter 39.

Every time the filter-coefficient group in the adaptive filter 21 is updated, the filter coefficient buffer 31 temporarily stores the updated filter-coefficient group which is supplied thereto from the adaptive filter 21. Further, the filter coefficient buffer 31 temporarily stores the current-time and previous-time filter-coefficient groups $w^{(1)}(n)$ and $w^{(2)}(n)$ which have been used by the adaptive filtering unit 20. It is assumed in this specification that "current-time" means the latest sampling time, and "previous-time" means a sampling time prior to the latest sampling time. Further, for the sake of expediency in explanation, the current-time filter-coefficient group w(n) is also referred to as the "current filter-coefficient group" hereafter, and the previous-time filter-coefficient group w(n−1) is also referred to as the "previous filter-coefficient group" hereafter.

A relationship between the current and previous filter-coefficient groups $w^{(1)}(n)$ and $w^{(2)}(n)$ stored in the filter coefficient buffer 31, and the filter-coefficient groups used by the adaptive filtering unit 20 is, for example, as shown in the following equation (7).

$$[w^{(1)}(n), w^{(2)}(n)] = [w(n), w(n-1)] \quad (7)$$

When receiving the next filter-coefficient group w(n+1) supplied thereto from the adaptive filtering unit 20, the filter coefficient buffer 31 deletes the oldest filter-coefficient group from the stored filter-coefficient groups, to update the filter-coefficient groups, as shown in the following equation (8).

$$[w^{(1)}(n+1), w^{(2)}(n+1)] = [w(n+1), w(n)] \quad (8)$$

Although it is preferable that the sampling times $T_n$ and $T_{n-1}$ of the current and previous filter-coefficient groups w(n) and w(n−1) stored in the filter coefficient buffer 31 be successive as shown in the above equation (7), the present invention is not limited to this example. The current and previous filter-coefficient groups at non-successive sampling times can be alternatively stored in the filter coefficient buffer 31, and can be used.

The signal buffer 37 functions as a delay circuit, and supplies, as a previous reception signal sequence, the reception signal sequence X(n−1) to the false echo calculator 32 after temporarily storing this reception signal sequence. The false echo calculator 32 performs a filtering operation using each of the filter-coefficient groups $w^{(1)}(n)$ and $w^{(2)}(n)$ read from the filter coefficient buffer 31, on the previous reception signal sequence X(n−1), to thereby calculate two false echo signals $d^{(1)}(n)$ and $d^{(2)}(n)$. Concretely, the k-th false echo signal $d^{(k)}(n)$ is calculated by performing a convolution operation using the k-th filter-coefficient group $w^{(k)}(n)$ in accordance with the following equation (9).

$$d^{(k)}(n) = \{w^{(k)}(n)\}^T X(n-1) \quad (9)$$

Further, the signal buffer 38 functions as a delay circuit, and outputs, as a previous voice-transmission signal, a voice-transmission signal y(n−1) to the evaluation value calculator 34 after temporarily storing this voice-transmission signal. The evaluation value calculator 34 calculates evaluated values $EV^{(1)}(n)$ and $EV^{(2)}(n)$ of an echo cancellation quantity on the basis of both the false echo signals $d^{(1)}(n)$ and $d^{(2)}(n)$, and the previous voice-transmission signal y(n−1). Concretely, the k-th evaluated value $EV^{(k)}(n)$ of the echo cancellation quantity is calculated as the square of the ratio of the previous voice-transmission signal y(n−1) to the difference between the previous voice-transmission signal y(n−1) and the k-th false echo signal $d^{(k)}(n)$, as shown in the following equation (10).

$$EV^{(k)}(n) = \{y(n-1)\}^2 / \{y(n-1) - d^{(k)}(n)\}^2 \quad (10)$$

The evaluation value calculator 34 further calculates an evaluated value $dEV^{(k)}(n)$ of the echo cancellation quantity as expressed in decibels, as shown below as equation (11), and supplies the evaluated value $dEV^{(k)}(n)$ of the echo cancellation quantity to the buffer controller 36.

$$dEV^{(k)}(n) = 10 \times \log_{10} EV^{(k)}(n) \quad (11)$$
$$= 10 \times \log_{10}\{y(n-1)\}^2 - 10 \times \log_{10}\{y(n-1) - d^{(k)}(n)\}^2$$

Figure 3A:
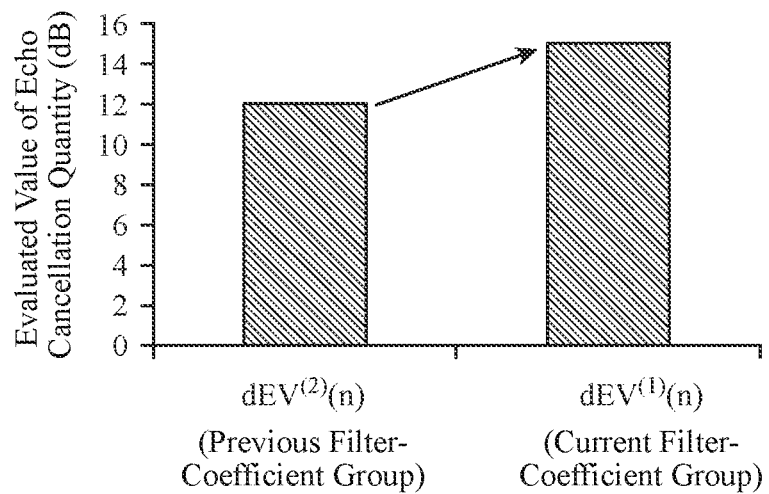
FIGS. 3A and 3B are graphs showing examples of evaluated values of an echo cancellation quantity according to Embodiment 1.
Figure 3B:
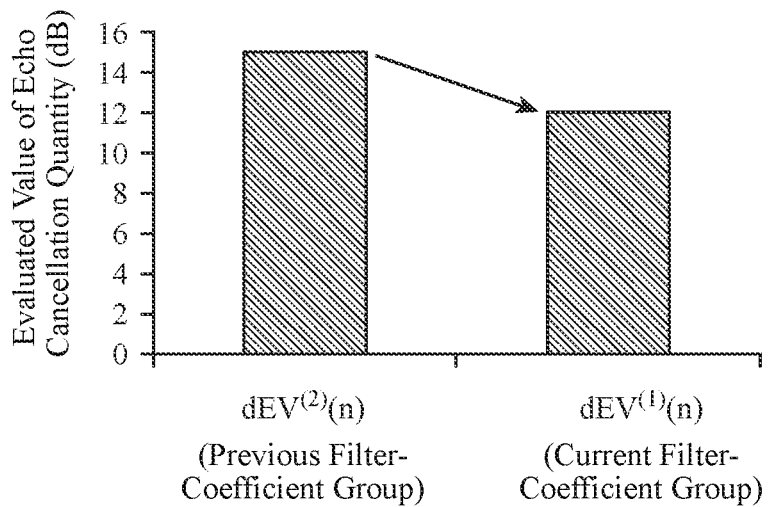

FIGS. 3A and 3B are graphs showing examples of evaluated values $dEV^{(1)}(n)$ and $dEV^{(2)}(n)$ of an echo cancellation quantity as expressed in decibels. FIGS. 3A and 3B illustrate the evaluated value $dEV^{(1)}(n)$ of the echo cancellation quantity calculated using the current filter-coefficient group w(n) and the evaluated value $dEV^{(2)}(n)$ of the echo cancellation quantity calculated using the previous filter-coefficient group w(n−1).

The buffer controller 36 functions as a filter selector for the FG filter 39. More specifically, the buffer controller 36 selects a new filter-coefficient group $w^{(p)}(n)$ from the filter-coefficient groups $w^{(1)}(n)$ and $w^{(2)}(n)$ stored in the filter coefficient buffer 31 on the basis of the evaluated values $dEV^{(1)}(n)$ and $dEV^{(2)}(n)$ of the echo cancellation quantity which are supplied thereto from the evaluation value calculator 34. For example, $w^{(p)}(n)$ corresponding to the largest value $dEV^{(p)}(n)$ of the evaluated values $dEV^{(1)}(n)$ and $dEV^{(2)}(n)$ of the echo cancellation quantity can be selected as the new filter-coefficient group. When the evaluated value $dEV^{(1)}(n)$ of the echo cancellation quantity calculated using the current filter-coefficient group w(n) is larger than the evaluated value $dEV^{(2)}(n)$ of the echo cancellation quantity calculated using the previous filter-coefficient group w(n−1), as shown in FIG. 3A, the buffer controller 36 can select the new filter-coefficient group $w^{(1)}(n)$ (p=1). In contrast, when the evaluated value $dEV^{(2)}(n)$ of the echo cancellation quantity calculated using the previous filter-coefficient group w(n−1) is larger than the evaluated value $dEV^{(1)}(n)$ of the echo cancellation quantity calculated using the current filter-coefficient group w(n), as shown in FIG. 3B, the buffer controller 36 can select the previous filter-coefficient group $w^{(2)}(n)$ (p=2).

The buffer controller 36 then supplies a control signal Cf showing the selection result to the filter coefficient buffer 31. The filter coefficient buffer 31 supplies the new filter-coefficient group $w^{(p)}$ to the FG filter 39 in accordance with this control signal Cf. Accordingly, the FG filter 39 can update a filter-coefficient group $w_{FG}(n-1)$ thereof to a filter-coefficient group $w_{FG}(n)$ by replacing the filter-coefficient group $w_{FG}(n-1)$ with the new filter-coefficient group $w^{(p)}(n)$.

The FG filter 39 performs a filtering operation using the filter-coefficient group $w_{FG}(n)$ on the reception signal sequence X(n) to thereby generate an estimated echo component $d_{FG}(n)$, and supplies the estimated echo component $d_{FG}(n)$ to the subtractor 25. Concretely, the FG filter 39 can generate an estimated echo component $d_{FG}(n)$ by performing a convolution operation on the reception signal sequence X(n) and the filter-coefficient group $w_{FG}(n)$ in accordance with the following equation (12).

$$d_{FG}(n) = \{w_{FG}(n)\}^T X(n) \quad (12)$$

The subtractor 25 receives both the voice-transmission signal y(n) and the estimated echo component $d_{FG}(n)$, and subtracts the estimated echo component $d_{FG}(n)$ from the voice-transmission signal y(n) to generate a residual signal e(n), as shown in the following equation (13).

$$e(n)=y(n)-d_{FG}(n) \quad (13)$$

This residual signal e(n) is outputted to the communication function unit 11 by the line side signal output unit $S_{out}$.

Because by replacing the filter-coefficient group $w_{FG}(n-1)$ of the FG filter 39 with the new filter-coefficient group $w^{(p)}(n)$ in this way, the result of the updating of the filter-coefficient group in the adaptive filtering unit 20 is incorporated in the FG filter 39 in a short time, the followability of the FG filter 39 to variations of the echo path becomes high.

In contrast, by using an oblivion coefficient γ the result of the updating of the filter-coefficient group in the adaptive filtering unit 20 can be incorporated in the FG filter 39 over a certain period of time, as will be explained below. In this case, the FG filter 39 generates a combination filter-coefficient group $w_{FG}(n)$ by performing a linear combination of a previous filter-coefficient group $w_{FG}(n-1)$ which has been used by the FG filter 39, and the new filter-coefficient group $w^{(p)}(n)$, as shown below as equation (14), and replaces the filter-coefficient group $w_{FG}(n-1)$ thereof with the combination filter-coefficient group $w_{FG}(n)$.

$$w_{FG}(n)=(1-\gamma)\cdot w_{FG}(n-1)+\gamma\cdot w^{(p)}(n) \quad (14)$$

In this case, the oblivion coefficient γ is a weighting factor assigned to the filter-coefficient group $w^{(p)}(n)$. Because by using such the combination filter-coefficient group $w_{FG}(n)$, the filter-coefficient group of the adaptive filtering unit 20 is incorporated in the FG filter 39 over a period of time, a further improvement in the robustness against a double talk can be provided.

Figure 4:
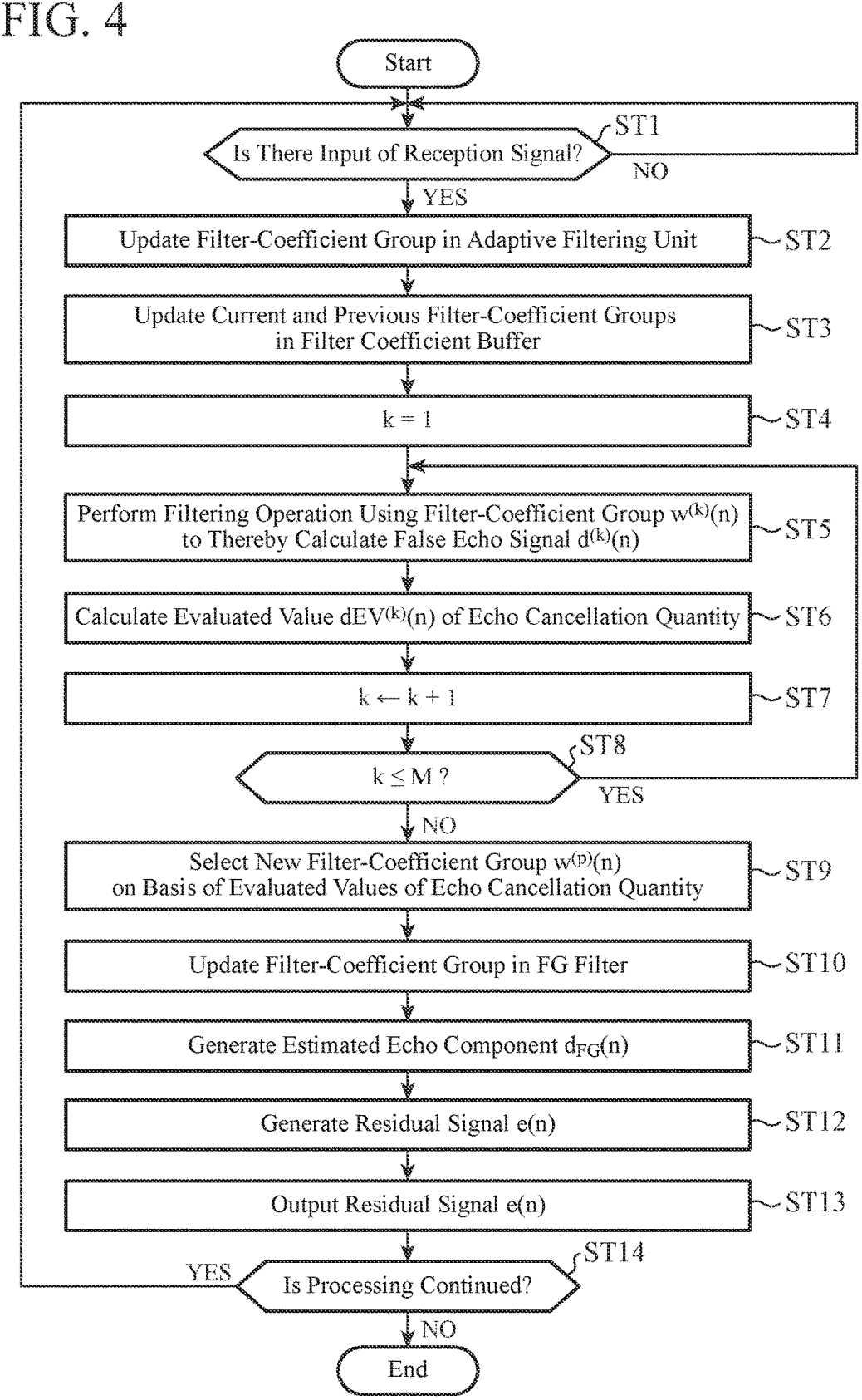
FIG. 4 is a flow chart schematically showing an example of the procedure of echo cancellation processing according to Embodiment 1.

Next, an example of the operation of the above-mentioned echo canceller 10 will be explained while referring to FIG. 4. FIG. 4 is a flow chart schematically showing an example of the procedure of the echo cancellation processing carried out by the echo canceller 10.

Referring to FIG. 4, the adaptive filtering unit 20 stands by until a reception signal sequence X(n) is inputted at a sampling time $T_n$ (when NO in step ST1). When a reception signal sequence X(n) is inputted (when YES in step ST1), the adaptive filtering unit 20 performs a filtering operation as mentioned above to update the filter-coefficient group (step ST2). When receiving the updated filter-coefficient group w(n) supplied thereto from the adaptive filter 21, the filter coefficient buffer 31 updates the filter-coefficient groups therein (step ST3).

Next, the false echo calculator 32 sets the filter-coefficient group number k to "1" (step ST4), and performs a filtering operation using the k-th filter-coefficient group $w^{(k)}(n)$ supplied thereto from the filter coefficient buffer 31, to thereby generate a false echo signal $d^{(k)}(n)$ (step ST5). This false echo signal $d^{(k)}(n)$ is supplied to the evaluation value calculator 34. Then, the evaluation value calculator 34 calculates an evaluated value $dEV^{(k)}(n)$ of an echo cancellation quantity on the basis of both the false echo signal $d^{(k)}(n)$ and the previous voice-transmission signal y(n−1) (step ST6). The evaluated value $dEV^{(k)}(n)$ of the echo cancellation quantity is supplied to the buffer controller 36. After that, the evaluation value calculator 34 increments the number k by 1 (step ST7), and, when the number k is equal to or smaller than a maximum M (=2) (when YES in step ST8), returns the processing procedure to the step ST5.

In contrast, when the number k is not equal to or smaller than the maximum M (=2) (when NO in step ST8), in other words, when the evaluated values $dEV^{(1)}(n)$ and $dEV^{(2)}(n)$ of the echo cancellation quantity are calculated for all the false echo signals $d^{(1)}(n)$ and $d^{(2)}(n)$, the processing procedure shifts to step ST9. In the example shown in FIG. 4, the two evaluated values $dEV^{(1)}(n)$ and $dEV^{(2)}(n)$ of the echo cancellation quantity are calculated in this order (steps ST4 to ST8). Alternatively, the evaluated values $dEV^{(1)}(n)$ and $dEV^{(2)}(n)$ of the echo cancellation quantity can be concurrently calculated in parallel.

The buffer controller 36, in the next step ST9, selects a new filter-coefficient group $w^{(p)}(n)$ from the filter-coefficient groups $w^{(1)}(n)$ and $w^{(2)}(n)$ stored in the filter coefficient buffer 31 on the basis of the evaluated values $dEV^{(1)}(n)$ and $dEV^{(2)}(n)$ of the echo cancellation quantity (step ST9). A control signal Cf showing this selection result is supplied to the filter coefficient buffer 31. The filter coefficient buffer 31 then updates the filter-coefficient group in the FG filter 39 by supplying the new filter-coefficient group $w^{(p)}(n)$ specified by the control signal Cf to the FG filter 39 (step ST10).

After that, the FG filter 39 performs a filtering operation on the reception signal sequence X(n) to thereby generate an estimated echo component $d_{FG}(n)$ (step ST11). The subtractor 25 subtracts the estimated echo component $d_{FG}(n)$ from the voice-transmission signal y(n) to generate a residual signal e(n) (step ST12). The line side signal output unit $S_{out}$ then outputs the residual signal e(n) to the communication function unit 11 (step ST13).

When the echo cancellation processing is continued after the step ST13 (when YES in step ST14), the processing procedure returns to the step ST1. In contrast, when the echo cancellation processing is not continued (when NO in step ST14), the echo cancellation processing is ended.

The hardware configuration of the above-mentioned echo canceller 10 can be implemented by, for example, a computer, such as a workstation or a mainframe, in which a CPU (Central Processing Unit) is included. As an alternative, the hardware configuration of the above-mentioned echo canceller 10 can be implemented by an LSI (Large Scale Integrated circuit) such as a DSP (Digital Signal Processor), an ASIC (Application Specific Integrated Circuit), or an FPGA (Field-Programmable Gate Array).

Figure 5:
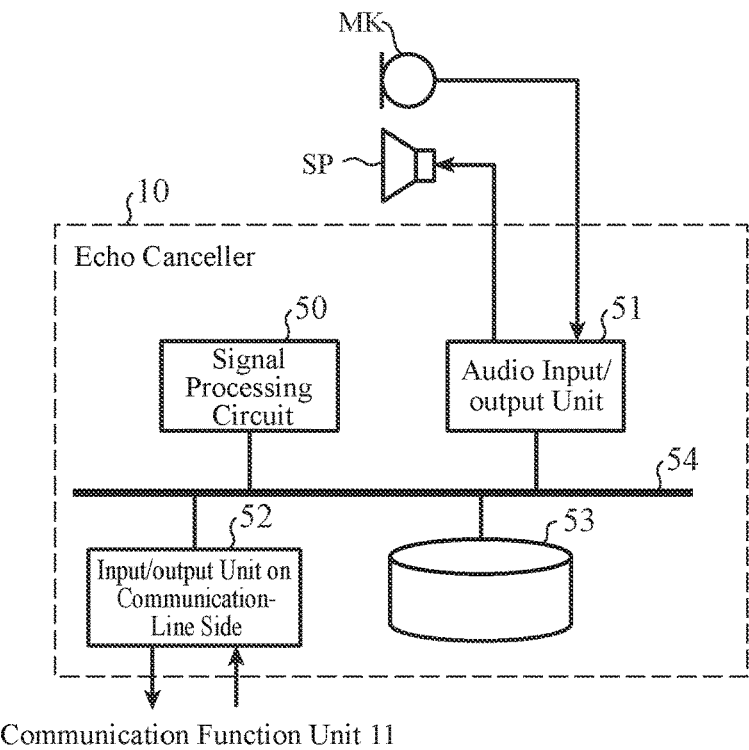
FIG. 5 is a diagram showing an example of the hardware configuration of the echo canceller of Embodiment 1.

FIG. 5 is a block diagram showing an example of the hardware configuration of the echo canceller 10 which is configured using an LSI such as a DSP, an ASIC, or an FPGA. In the example shown in FIG. 5, the echo canceller 10 is comprised of a signal processing circuit 50, an audio input/output unit 51, an input/output unit 52 on the communication-line side, a recording medium 53, and a signal path 54 such as a bus. The audio input/output unit 51 is an interface circuit that implements the functions of the signal input unit $S_{in}$ and the signal output unit $R_{out}$, and the input/output unit 52 on the communication-line side is an interface circuit that implements the functions of the line side signal output unit $S_{out}$ and the line side signal input unit $R_{in}$. The functions of the adaptive filtering unit 20, the echo estimator 30, and the subtractor 25, which are mentioned above, can be implemented by the signal processing circuit 50 and the recording medium 53 which are shown in FIG. 5. The recording medium 53 can be used as the filter coefficient buffer 31 and the false echo buffer 33. As the recording medium 53, for example, a volatile memory such as an SDRAM (Synchronous DRAM), an HDD (hard disk drive), or an SSD (solid-state drive) can be used.

Figure 6:
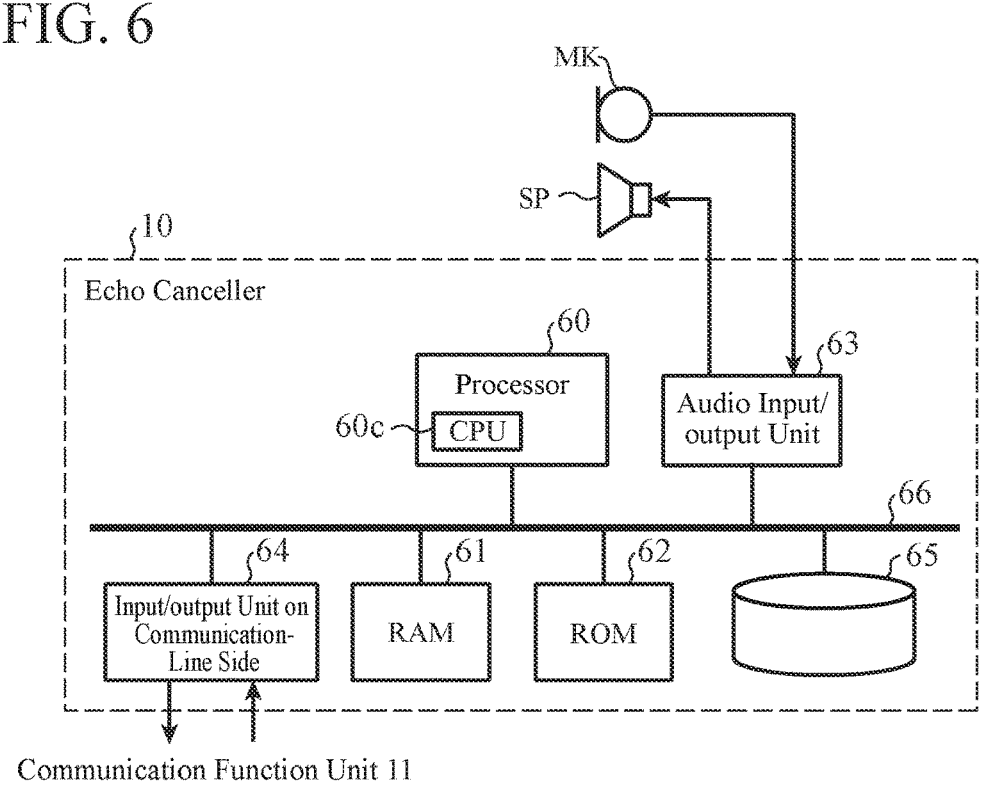
FIG. 6 is a diagram showing another example of the hardware configuration of the echo canceller of Embodiment 1.

On the other hand, FIG. 6 is a block diagram showing an example of the hardware configuration of the echo canceller 10 which is configured using a computer. In the example shown in FIG. 6, the echo canceller 10 is comprised of a processor 60 in which a CPU 60c is included, a RAM (Random Access Memory) 61, a ROM (Read Only Memory) 62, an audio input/output unit 63, an input/output unit 64 on the communication-line side, a recording medium 65, and a signal path 66 such as a bus. The audio input/output unit 63 is an interface circuit that implements the functions of the signal input unit $S_{in}$ and the signal output unit $R_{out}$, and the input/output unit 64 on the communication-line side is an interface circuit that implements the functions of the line side signal output unit $S_{out}$ and the line side signal input unit $R_{in}$. The functions of the adaptive filtering unit 20, the echo estimator 30, and the subtractor 25 can be implemented by the processor 60 and the recording medium 65. The recording medium 65 can be used as the filter coefficient buffer 31 and the false echo buffer 33. The processor 60 implements the functions of the adaptive filtering unit 20, the echo estimator 30, and the subtractor 25 by using the RAM 61 as a memory for operations, and operating in accordance with a computer program read from the ROM 62. As the recording medium 65, for example, a volatile memory such as an SDRAM, an HDD, or an SSD can be used.

As described above, the echo canceller 10 of Embodiment 1 can select a filter-coefficient group $w^{(p)}(n)$ from the plural filter-coefficient groups $w^{(1)}(n)$ and $w^{(2)}(n)$ stored in the filter coefficient buffer 31 on the basis of the evaluated values $dEV^{(1)}(n)$ and $dEV^{(2)}(n)$ of the echo cancellation quantity, and set this filter-coefficient group $w^{(p)}(n)$ to the FG filter 39. Therefore, even when the degree of accuracy of the estimation of the echo path characteristics decreases in the adaptive filtering unit 20, and erroneous learning occurs, the erroneous learning can be prevented from being incorporated in the FG filter 39. Further, an improvement in the robustness against a disturbance signal such as a near end speaker's voice or background noise can also be provided. Therefore, echo cancellation performance which is stable under an environment in which a double talk occurs can be achieved.

Embodiment 2

Figure 7:
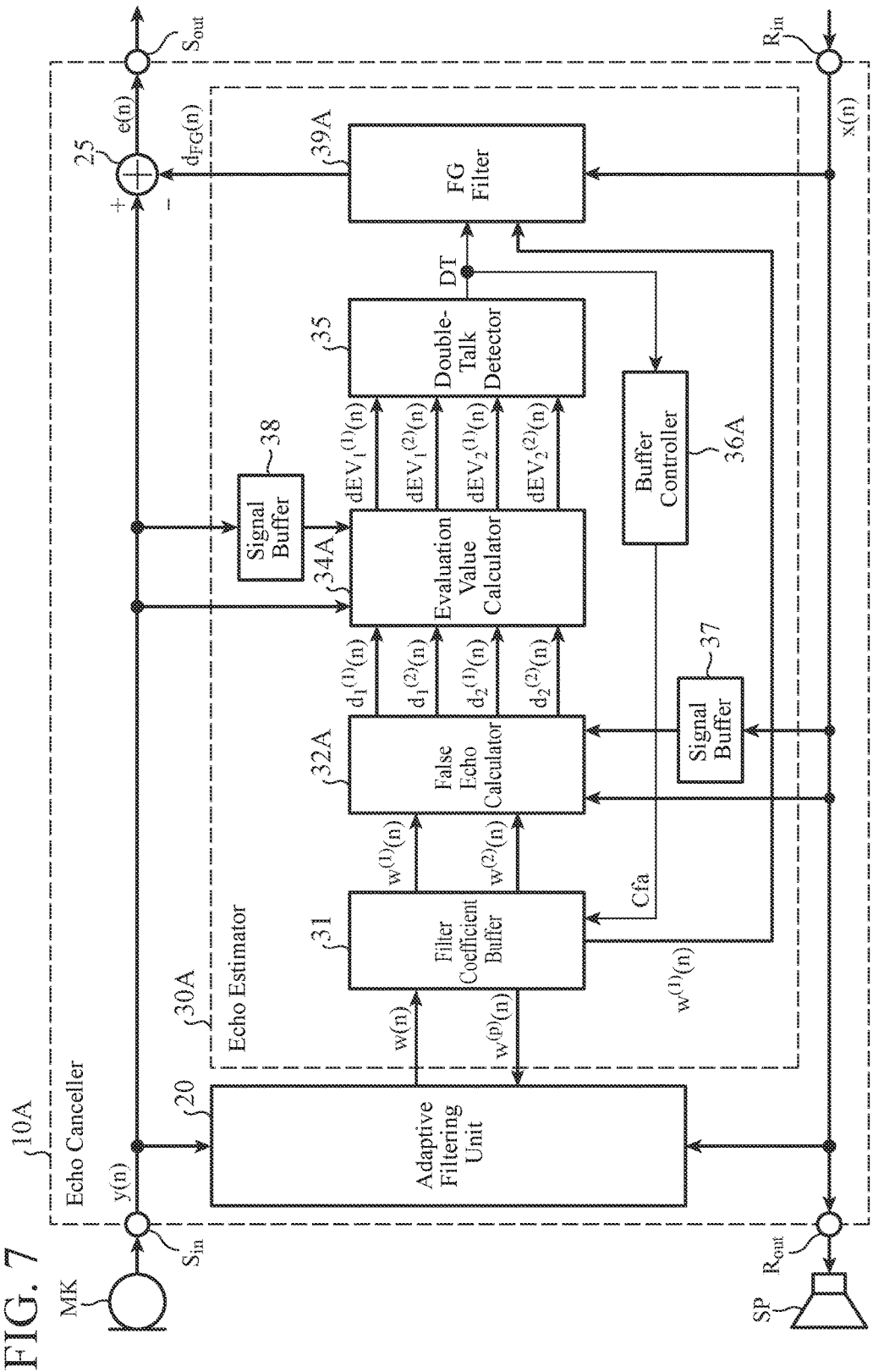
FIG. 7 is a diagram showing the schematic configuration of an echo canceller of Embodiment 2 according to the present invention.

Next, Embodiment 2 according to the present invention will be explained. FIG. 7 is a block diagram showing the schematic configuration of an echo canceller 10A of Embodiment 2. A voice telecommunications device can be configured by a combination of the echo canceller 10A of the present embodiment, and a communication function unit 11 shown in FIG. 1, like in the case of the echo canceller 10 according to above-mentioned Embodiment 1.

As shown in FIG. 7, the echo canceller 10A of the present embodiment includes a signal input unit $S_{in}$, a signal output unit $R_{out}$, a line side signal output unit $S_{out}$, and a line side signal input unit $R_{in}$ and also includes an adaptive filtering unit 20 and a subtractor 25, like the echo canceller 10 according to above-mentioned Embodiment 1.

Further, the echo canceller 10A of the present embodiment includes an echo estimator 30A. This echo estimator 30A is configured so as to include a filter coefficient buffer 31, a false echo calculator 32A, an evaluation value calculator 34A, a double-talk detector 35, a buffer controller 36A, signal buffers 37 and 38, and an FG (foreground) filter 39A.

The filter coefficient buffer 31 shown in FIG. 7 has the same function as the filter coefficient buffer 31 of the above-mentioned Embodiment 1, and temporarily stores current and previous filter-coefficient groups $w^{(1)}(n)$ and $w^{(2)}(n)$ which have been used by the adaptive filtering unit 20.

The signal buffer 37 functions as a delay circuit, and outputs, as a previous reception signal sequence, a reception signal sequence $X(n-1)$ to the false echo calculator 32A after temporarily storing this reception signal sequence. The previous reception signal sequence $X(n-1)$ is inputted from the signal buffer 37 to the false echo calculator 32, and a current reception signal sequence $X(n)$ is also inputted to the false echo calculator 32.

The false echo calculator 32A performs a filtering operation using the current filter-coefficient group $w^{(1)}(n)$ supplied thereto from the filter coefficient buffer 31, on the previous reception signal sequence $X(n-1)$ to thereby calculates a false echo signal $d_2^{(1)}(n)$, and also performs a filtering operation using the current filter-coefficient group $w^{(1)}(n)$ on the current reception signal sequence $X(n)$ to thereby calculate a false echo signal $d_1^{(1)}(n)$. The false echo calculator 32A also performs a filtering operation using the previous filter-coefficient group $w^{(2)}(n)$ supplied thereto from the filter coefficient buffer 31, on the previous reception signal sequence $X(n-1)$, to thereby calculate a false echo signal $d_2^{(2)}(n)$, and also performs a filtering operation using the previous filter-coefficient group $w^{(2)}(n)$ on the current reception signal sequence $X(n)$ to thereby calculate a false echo signal $d_1^{(2)}(n)$.

Concretely, the false echo calculator 32A can generate a false echo signal $d_1^{(k)}(n)$ by performing a convolution operation on the current reception signal sequence $X(n)$ and the filter-coefficient group $w^{(k)}(n)$ (k=1, 2) in accordance with equation (15A) shown below, and generate a false echo signal $d_2^{(k)}(n)$ by performing a convolution operation on the previous reception signal sequence $X(n-1)$ and the filter-coefficient group $w^{(k)}(n)$ in accordance with equation (15B) shown below.

$$d_1^{(k)}(n) = \{w^{(k)}(n)\}^T X(n) \quad (15A)$$

$$d_2^{(k)}(n) = \{w^{(k)}(n)\}^T X(n-1) \quad (15B)$$

On the other hand, the signal buffer 38 functions as a delay circuit, and outputs, as a previous voice-transmission signal, a voice-transmission signal $y(n-1)$ to the evaluation value calculator 34A after temporarily storing this voice-transmission signal. The previous voice-transmission signal $y(n-1)$ is inputted from the signal buffer 38 to the evaluation value calculator 34A, and a current voice-transmission signal $y(n)$ is also inputted to the evaluation value calculator 34A.

The evaluation value calculator 34A calculates an evaluated value $EV_1^{(k)}(n)$ of an echo cancellation quantity on the basis of the current voice-transmission signal $y(n)$ and the false echo signal $d_1^{(k)}(n)$, in accordance with equation (16A) shown below, and also calculates an evaluated value $EV_2^{(k)}(n)$ of the echo cancellation quantity on the basis of the previous voice-transmission signal $y(n-1)$ and the false echo signal $d_2^{(k)}(n)$, in accordance with equation (16B) shown below.

$$EV_1^{(k)}(n) = \{y(n)\}^2 / \{y(n) - d_1^{(k)}(n)\}^2 \quad (16A)$$

$$EV_2^{(k)}(n) = \{y(n-1)\}^2 / \{y(n-1) - d_2^{(k)}(n)\}^2 \quad (16B)$$

The evaluation value calculator 34A further calculates evaluated values $dEV_1^{(k)}(n)$ and $dEV_2^{(k)}(n)$ of the echo cancellation quantity expressed in decibels, as shown below as equations (17A) and (17B), and supplies these evaluated values $dEV_1^{(k)}(n)$ and $dEV_2^{(k)}(n)$ of the echo cancellation quantity to the double-talk detector 35.

$$dEV_1^{(k)}(n) = 10 \times \log_{10} EV_1^{(k)}(n) \quad (17A)$$

$$dEV_2^{(k)}(n) = 10 \times \log_{10} EV_2^{(k)}(n) \quad (17B)$$

The double-talk detector 35 has a function to compare with each other the evaluated values $dEV^{(1)}(n)$ and $dEV^{(2)}(n)$ of the echo cancellation quantity calculated on the basis of the current reception signal sequence $X(n)$ and the current voice-transmission signal $y(n)$, and compare with each other the evaluated values $dEV_2^{(1)}(n)$ and $dEV_2^{(2)}(n)$ of the echo cancellation quantity calculated on the basis of the previous reception signal sequence $X(n-1)$ and the previous voice-transmission signal $y(n-1)$, thereby determining which one of a normal state, a double talk state, and an echo-path variation state has occurred. The details of this function will be explained below. An echo-path variation means a variation of a transmission path via which an acoustic echo travels between a speaker SP and a sound collector MK, and a normal state means a state in which neither a double talk nor an echo-path variation has occurred. A decision result DT acquired by the double-talk detector 35 is supplied to both the FG filter 39A and the buffer controller 36A.

The FG filter 39A receives the current filter-coefficient group $w^{(1)}(n)$ supplied thereto from the filter coefficient buffer 31. The FG filter 39A incorporates the current filter-coefficient group $w^{(1)}(n)$ in a filter-coefficient group $w_{FG}(n)$ of the FG filter 39A with a degree of incorporation depending on the decision result DT acquired by the double-talk detector 35. For example, when the decision result DT shows either a normal state or an echo-path variation state, the FG filter 39A can maximize the degree of incorporation of the filter-coefficient group $w^{(1)}(n)$ in the filter-coefficient group $w_{FG}(n)$ by replacing a filter-coefficient group $w_{FG}(n-1)$ thereof with the filter-coefficient group $w^{(1)}(n)$ to update the filter-coefficient group thereof. In contrast, when the decision result DT shows a double talk state, the degree of incorporation can be minimized by stopping the updating of the filter-coefficient group $w_{FG}(n-1)$ thereof.

Further, the FG filter 39A can use a combination filter-coefficient group $w_{FG}(n)$ given by the following equation (18).

$$w_{FG}(n)=(1-\gamma)\cdot w_{FG}(n-1)+\gamma\cdot w^{(1)}(n) \quad (18)$$

In this case, the degree of incorporation can be adjusted using an oblivion coefficient $\gamma$. It is preferable to set the oblivion coefficient $\gamma$ to a value close to zero. For example, it is desirable that the oblivion coefficient is larger than zero and falls within a range equal to or smaller than 0.1. Further, for example, when the decision result DT shows an echo-path variation state, the FG filter 39A can increase the degree of incorporation at the time of an echo-path variation state to greater than that at the time of a normal state by setting the value of the oblivion coefficient $\gamma$ to be larger than that at the time of a normal state. In contrast, when the decision result DT shows a double talk state, the FG filter 39A can lower the degree of incorporation at the time of a double talk state in comparison with that at the time of a normal state, by setting the value of the oblivion coefficient $\gamma$ to be smaller than that at the time of a normal state.

The FG filter 39A performs a filtering operation using the filter-coefficient group $w_{FG}(n)$ on the reception signal sequence $X(n)$ to thereby generate an estimated echo component $d_{FG}(n)$, and supplies the estimated echo component $d_{FG}(n)$ to the subtractor 25, like the FG filter 39 of Embodiment 1. The subtractor 25 subtracts the estimated echo component $d_{FG}(n)$ from the voice-transmission signal $y(n)$ to generate a residual signal $e(n)$. This residual signal $e(n)$ is outputted to the communication function unit 11 by the line side signal output unit $S_{out}$.

On the other hand, the buffer controller 36A functions as a filter selector for the adaptive filtering unit 20. More specifically, the buffer controller 36A selects a new filter-coefficient group $w^{(p)}(n)$ corresponding to the decision result DT acquired by the double-talk detector 35 from the current and previous filter-coefficient groups $w^{(1)}(n)$ and $w^{(2)}(n)$ stored in the filter coefficient buffer 31. The buffer controller 36A then supplies a control signal Cfa showing the selection result to the filter coefficient buffer 31. The filter coefficient buffer 31 updates the filter-coefficient group in the adaptive filtering unit 20 by supplying the new filter-coefficient group $w^{(p)}(n)$ specified by the control signal Cfa to the adaptive filtering unit 20. For example, when the decision result DT shows either a normal state or an echo-path variation state, the buffer controller 36A can select the current filter-coefficient group $w^{(1)}(n)$, whereas when the decision result DT shows a double talk state, the buffer controller 36A can select the previous filter-coefficient group $w^{(2)}(n)$.

Figure 8:
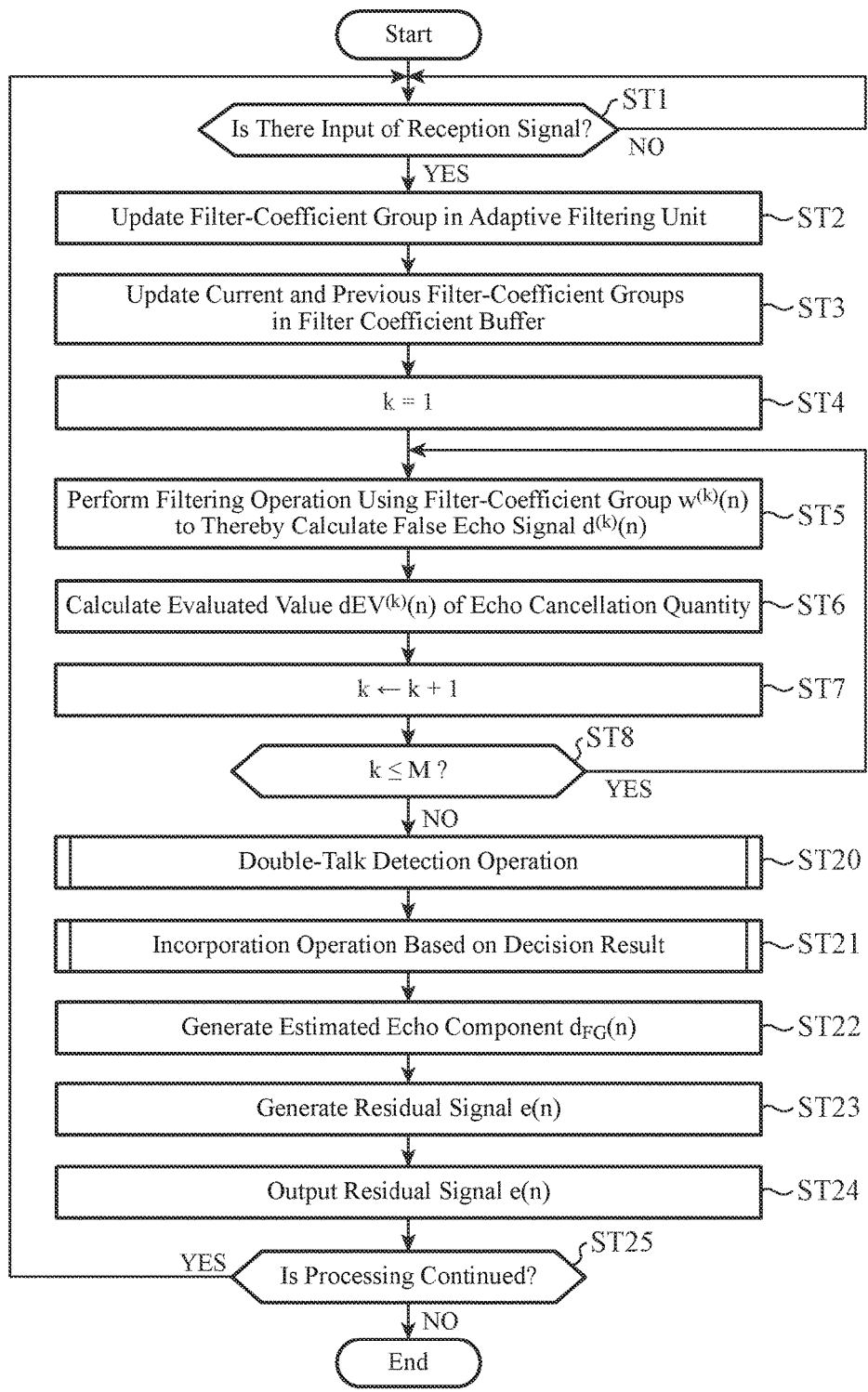
FIG. 8 is a flow chart schematically showing an example of the procedure of echo cancellation processing according to Embodiment 2.

Next, an example of the operation of the above-mentioned echo canceller 10A will be explained while referring to FIG. 8. FIG. 8 is a flow chart schematically showing an example of the procedure of the echo cancellation processing carried out by the echo canceller 10A. Because the details of operations of steps ST1 to ST8 of FIG. 8 are the same as those of the steps ST1 to ST8 of FIG. 4 according to above-mentioned Embodiment 1, the explanation of the details of the operations will be omitted hereafter.

Figure 9:
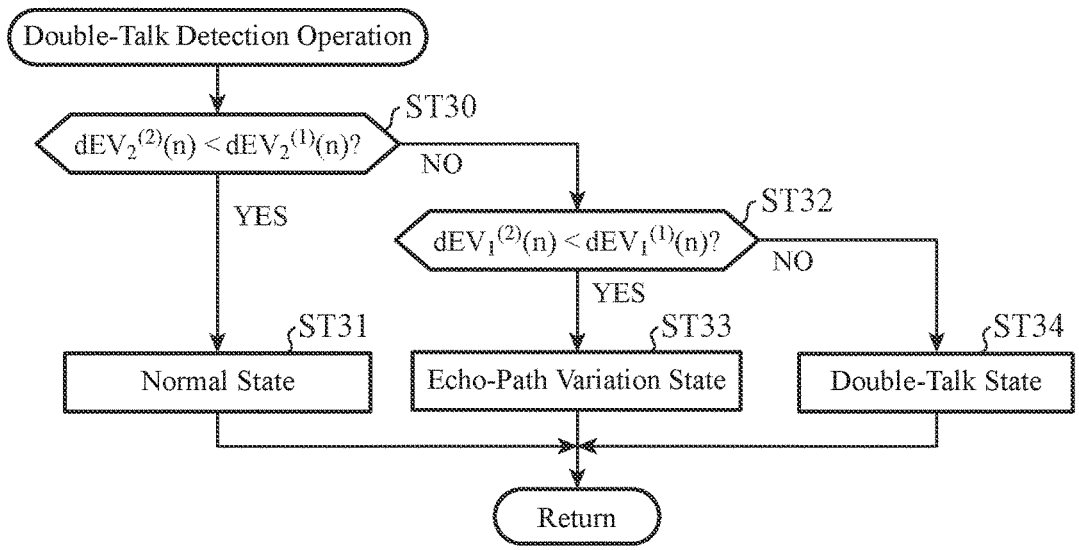
FIG. 9 is a flow chart showing an example of the procedure of a double-talk detection operation according to Embodiment 2.
Figure 10A:
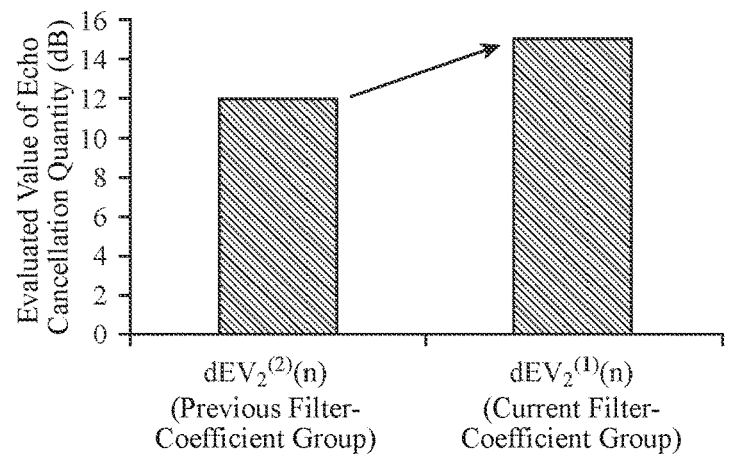
FIGS. 10A and 10B are graphs showing a first example of evaluated values of an echo cancellation quantity according to Embodiment 2.
Figure 10B:
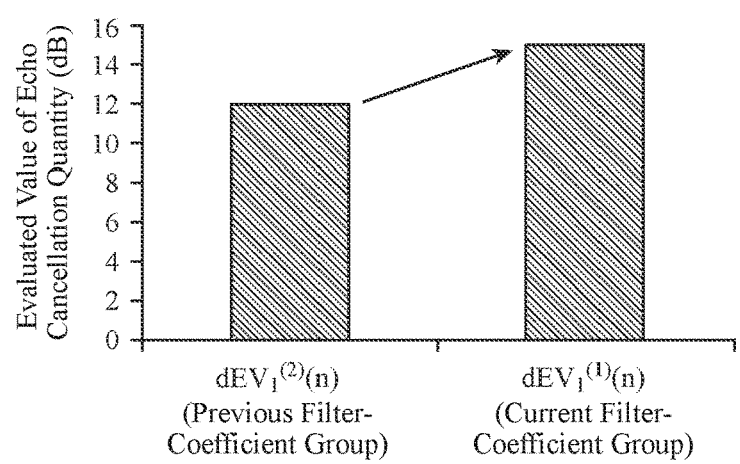

FIG. 9 is a flow chart showing an example of the procedure of a double-talk detection operation of the step ST20 of FIG. 8. Referring to FIG. 9, the double-talk detector 35 compares the echo cancellation amount evaluated values $dEV_2^{(1)}(n)$ and $dEV_2^{(2)}(n)$ which are calculated on the basis of the previous reception signal sequence $X(n-1)$ and the previous voice-transmission signal $y(n-1)$ (step ST30). When determining that the evaluated value $dEV_2^{(1)}(n)$ of the echo cancellation quantity is larger than the evaluated value $dEV_2^{(2)}(n)$ of the echo cancellation quantity (when YES in step ST30), the double-talk detector 35 decides that a normal state has occurred (step ST31). FIGS. 10A and 10B are diagrams illustrating an inequality relation between the evaluated values $dEV_2^{(1)}(n)$ and $dEV_2^{(2)}(n)$ of the echo cancellation quantity in this state, and an inequality relation between the evaluated values $dEV_1^{(1)}(n)$ and $dEV_1^{(2)}(n)$ of the echo cancellation quantity in this state. As shown in FIG. 10B, when the inequality relation shown in FIG. 10A is established, it is assumed that the evaluated value $dEV_1^{(1)}(n)$ of the echo cancellation quantity is larger than the evaluated value $dEV_1^{(2)}(n)$ of the echo cancellation quantity.

Figure 11A:
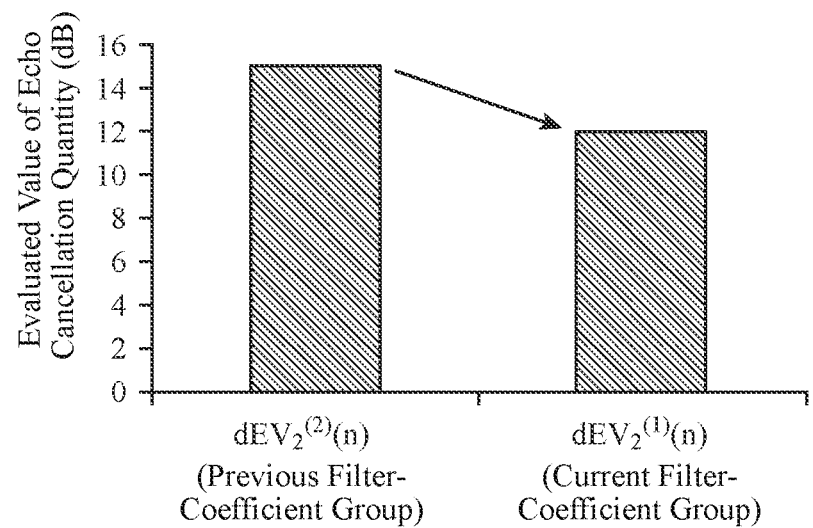
FIGS. 11A and 11B are graphs showing a second example of evaluated values of an echo cancellation quantity according to Embodiment 2.
Figure 11B:
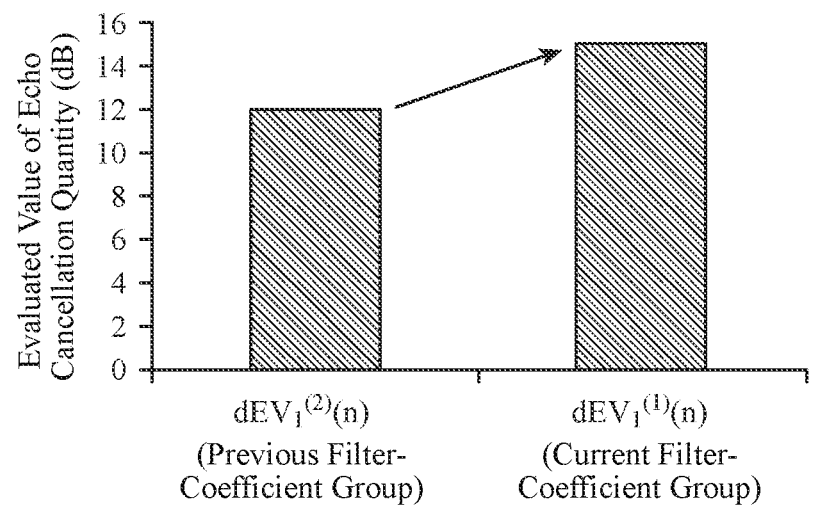

In contrast, when determining that the evaluated value $dEV_2^{(1)}(n)$ of the echo cancellation quantity is equal to or smaller than the evaluated value $dEV_2^{(2)}(n)$ of the echo cancellation quantity (when NO in step ST30), the double-talk detector 35 further compares with each other the evaluated values $dEV_1^{(1)}(n)$ and $dEV_1^{(2)}(n)$ of the echo cancellation quantity which are calculated on the basis of the current reception signal sequence $X(n)$ and the current voice-transmission signal $y(n)$ (step ST32). When determining that the evaluated value $dEV_2^{(1)}(n)$ of the echo cancellation quantity is larger than the evaluated value $dEV_1^{(2)}(n)$ of the echo cancellation quantity (when YES in step ST32), the double-talk detector 35 decides that an echo-path variation state has occurred (step ST33). FIGS. 11A and 11B are diagrams illustrating an inequality relation between the evaluated values $dEV_2^{(1)}(n)$ and $dEV_2^{(2)}(n)$ of the echo cancellation quantity and an inequality relation between the evaluated values $dEV_1^{(1)}(n)$ and $dEV_1^{(2)}(n)$ of the echo cancellation quantity, in this state.

Figure 12A:
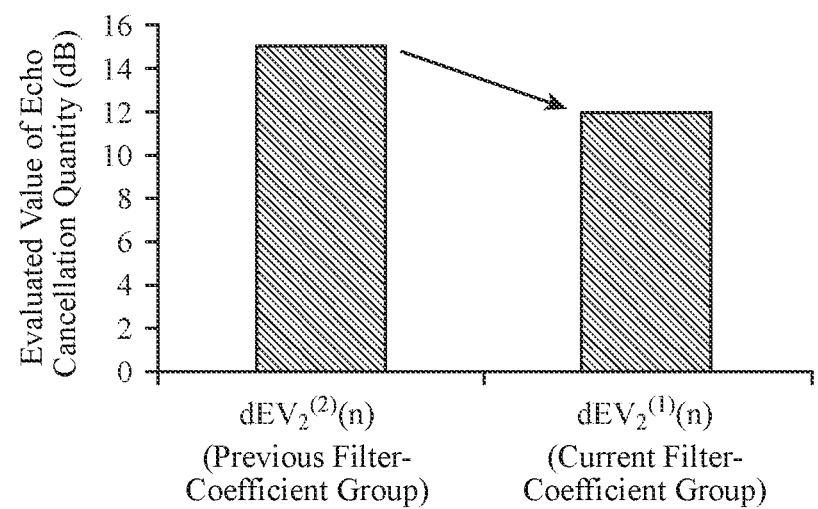
FIGS. 12A and 12B are graphs showing a third example of evaluated values of an echo cancellation quantity according to Embodiment 2.
Figure 12B:
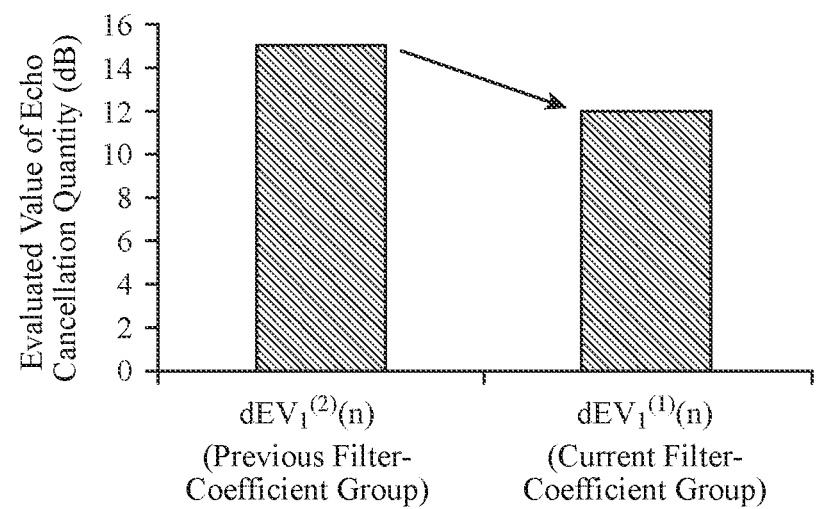

When, in the step ST32, determining that the evaluated value $dEV_1^{(1)}(n)$ of the echo cancellation quantity is equal to or smaller than the evaluated value $dEV_1^{(2)}(n)$ of the echo cancellation quantity (when NO in step ST32), the double-talk detector 35 decides that a double talk state has occurred (step ST34). FIGS. 12A and 12B are diagrams illustrating an inequality relation between the evaluated values $dEV_2^{(1)}(n)$ and $dEV_2^{(2)}(n)$ of the echo cancellation quantity and an inequality relation between the evaluated values $dEV_1^{(1)}(n)$ and $dEV_1^{(2)}(n)$ of the echo cancellation quantity, in this state. After that, the processing procedure shifts to the step ST21 of FIG. 8. The determination in each of the above-mentioned steps ST30 and ST32 can be carried out using a threshold.

In the next step ST21 (FIG. 8), an incorporation operation based on the decision result DT is performed. More specifically, the FG filter 39A incorporates the filter-coefficient group $w^{(1)}(n)$ in the filter-coefficient group $w_{FG}(n)$ thereof with the degree of incorporation depending on the decision result DT. In parallel with this operation, the buffer controller 36A selects a new filter-coefficient group $w^{(p)}(n)$ corresponding to the decision result DT from the current and previous filter-coefficient groups $w^{(1)}(n)$ and $w^{(2)}(n)$ stored in the filter coefficient buffer 31, and supplies a control signal Cfa showing the selection result to the filter coefficient buffer 31. The filter coefficient buffer 31 replaces the filter-coefficient group of the adaptive filter 21 with the new filter-coefficient group $w^{(p)}(n)$ to update the filter-coefficient group of the adaptive filter by supplying the new filter-coefficient group $w^{(p)}(n)$ to the adaptive filter 21 in accordance with the control signal Cfa.

The FG filter 39A, in the next step ST22, performs a filtering operation using the filter-coefficient group $w_{FG}(n)$ on the reception signal sequence X(n) to thereby generate an estimated echo component $d_{FG}(n)$. Then, the subtractor 25 subtracts the estimated echo component $d_{FG}(n)$ from the voice-transmission signal y(n) to generate a residual signal e(n) (step ST23). This residual signal e(n) is then outputted to the communication function unit 11 by the line side signal output unit $S_{out}$ (step ST24).

When the echo cancellation processing is continued after the step ST24 (when YES in step ST25), the processing procedure returns to the step ST1. In contrast, when the echo cancellation processing is not continued (when NO in step ST25), the echo cancellation processing is ended.

The hardware configuration of the echo canceller 10A of the present embodiment can be implemented by, for example, a computer, such as a workstation or a mainframe, in which a CPU is included. As an alternative, the hardware configuration of the echo canceller 10A can be implemented by an LSI such as a DSP, an ASIC, or an FPGA. The hardware configuration of the echo canceller 10A can be alternatively implemented by the configuration shown in FIG. 5 or 6, like in the case of Embodiment 1.

As described above, the echo canceller 10A of Embodiment 2 can determine which one of a normal state, an echo-path variation state, and a double talk state has occurred, and optimize the filter-coefficient group of the FG filter 39A and the filter-coefficient group of the adaptive filtering unit 20 in accordance with a result of the determination. Therefore, echo cancellation performance which is more stable than that in the case of Embodiment 1 can be achieved.

Embodiment 3

Figure 13:
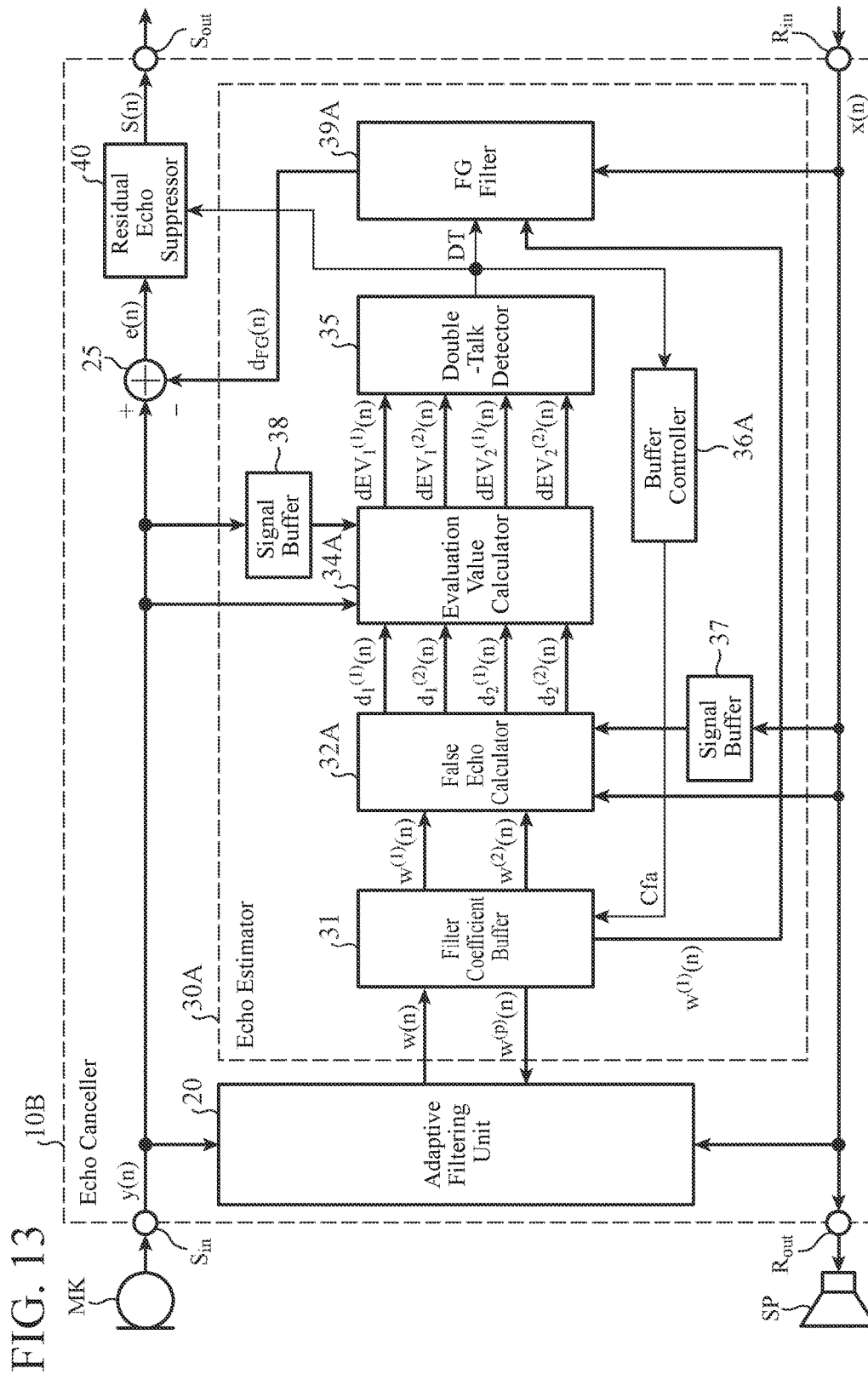
FIG. 13 is a diagram showing the schematic configuration of an echo canceller of Embodiment 3 according to the present invention.

Next, Embodiment 3 according to the present invention will be explained. FIG. 13 is a block diagram showing the schematic configuration of an echo canceller 10B of Embodiment 3. A voice telecommunications device can be configured by a combination of the echo canceller 10B of the present embodiment and a communication function unit 11 shown in FIG. 1, like in the case of the echo canceller 10 according to above-mentioned Embodiment 1.

As shown in FIG. 13, the echo canceller 10B of the present embodiment includes a signal input unit $S_{in}$, a signal output unit $R_{out}$, a line side signal output unit $S_{out}$, and a line side signal input unit $R_{in}$, and also includes an adaptive filtering unit 20, a subtractor 25, and an echo estimator 30A, like the echo canceller 10A of Embodiment 2 described above. The configuration of the echo canceller 10B of the present embodiment is the same as that of the echo canceller 10A of Embodiment 2 described above, with the exception that a residual echo suppressor 40 is included as a stage following the echo estimator 30A. The residual echo suppressor 40 has a function of suppressing a residual echo component included in a residual signal e(n) outputted from the subtractor 25, and generating an echo suppression signal S(n). What is necessary is just to implement this function by using a known technique, and this known technique is not limited particularly. For example, a residual echo suppressing technique disclosed by Non-patent Literature 3 shown below can be used.

Non-patent Literature 3: S. Gustafsson, R. Martin, P. Jax, and P. Vary, "A Psychoacoustic Approach to Combined Acoustic Echo Cancellation and Noise Reduction," IEEE TRANSACTIONS ON SPEECH AND AUDIO PROCESSING, VOL. 10, NO. 5, July 2002.

For example, the ITU-T recommendation P.341 states that 46 dB should be ensured as the amount of echo cancellation during a handsfree telephone call. In order to ensure this amount of echo cancellation, the residual echo suppressor 40 can be used.

Further, the residual echo suppressor 40 of the present embodiment has a function of adjusting a degree of suppression (i.e., suppression strength) of the residual echo component in accordance with a decision result DT acquired by a double-talk detector 35. For example, when the decision result DT shows a double talk state, the suppression strength can be reduced to lower than that at the time of a normal state so as to prevent a transmission voice from being suppressed. Further, because there is a possibility that the follow-up to an echo-path variation by the adaptive filtering unit 20 is delayed when the decision result DT shows an echo-path variation state, the residual echo component can be reduced from the output signal of the echo canceller 10B by increasing the suppression strength to higher than that at the time of a normal state.

FIG. 14 is a flow chart schematically showing an example of the procedure of the echo cancellation processing carried out by the echo canceller 10B of Embodiment 3. Because the details of operations of steps ST1 to ST23 of FIG. 14 are the same as those of the steps ST1 to ST23 of FIG. 8 according to above-mentioned Embodiment 2, the explanation of the details of the operations will be omitted hereafter.

Referring to FIG. 14, the residual echo suppressor 40, in step ST40, suppresses the residual echo component in the residual signal e(n) with the degree corresponding to the decision result DT acquired by the double-talk detector 35, and generates an echo suppression signal S(n). The line side signal output unit $S_{out}$ then outputs the echo suppression signal S(n) to the communication function unit 11 (step ST41). After that, when the echo cancellation processing is continued (when YES in step ST42), the processing procedure returns to the step ST1. In contrast, when the echo cancellation processing is not continued (when NO in step ST42), the echo cancellation processing is ended.

As described above, because the echo canceller 10B of Embodiment 3 includes the residual echo suppressor 40 that suppresses the residual echo component with the degree corresponding to the decision result DT acquired by the double-talk detector 35, it is possible to suppress the residual echo component while lessening a feeling of suppression of a transmission voice.

Although the various embodiments according to the present invention have been described with reference to the drawings, as described above, these embodiments exemplify the present invention, and various embodiments other than these embodiments can also be adopted. For example, although in above-mentioned Embodiments 1 to 3, the echo cancellation processing is carried out using the two filter-coefficient groups $w^{(1)}(n)$ and $w^{(2)}(n)$ stored in the filter coefficient buffer 31, the present invention is not limited to this example, and the echo cancellation processing can be carried out using three or more filter-coefficient groups.

Within the scope of the present invention, an arbitrary combination of two or more of above-mentioned Embodiments 1 to 3 can be made, a change can be made in an arbitrary component of any of the above-mentioned embodiments, or an arbitrary component of any of the above-mentioned embodiments can be omitted.

INDUSTRIAL APPLICABILITY

The echo canceller device and voice telecommunications device according to the present invention can be used for, for example, a fixed-line phone, a mobile phone with a loud speaking function, a handsfree communication system, and a video conferencing system.

REFERENCE SIGNS LIST 1A, 1B: voice telecommunications devices; 10, 10A, 10B: echo cancellers; 11: communication function unit; 20: adaptive filtering unit; 21: adaptive filter; 22: subtractor; 23: adaptation algorithm unit (AAL); 25: subtractor; 30, 30A: echo estimator; 31: filter coefficient buffer; 32, 32A: false echo calculators; 34, 34A: evaluation value calculators; 35: double-talk detector; 36, 36A: buffer controllers (filter selectors); 37, 38: signal buffer; 39, 39A: FG (foreground) filter; 40: residual echo suppressor; 50: signal processing circuit; 51: audio input/output unit; 52: input/output unit on the communication-line side; 53: recording medium; 54: signal path; 60: processor; 61: RAM; 62: ROM; 63: audio input/output unit; 64: input/output unit on the communication-line side; 65: recording medium; 66: signal path; MK: sound collector; and SP: speaker.

The invention claimed is:

1. An echo canceller device comprising:
an adaptive filtering unit to perform a filtering operation using a filter-coefficient group on a reception signal sequence input thereto, and to update the filter-coefficient group on a basis of a voice-transmission signal input thereto from a sound collector;
a false echo calculator to acquire current and previous filter-coefficient groups which have been used by the adaptive filtering unit, and to perform filtering operations using the current and previous filter-coefficient groups, respectively, on the input reception signal sequence to thereby calculate false echo signals;
a voice-transmission signal buffer to output, as a previous voice-transmission signal, a voice-transmission signal input thereto from the sound collector, after temporarily storing the voice-transmission signal;
an evaluation value calculator to calculate evaluated values of an echo cancellation quantity corresponding to the respective false echo signals on a basis of the previous voice-transmission signal and the false echo signals;
a filter selector to select a new filter-coefficient group from among the current and previous filter-coefficient groups on a basis of the evaluated values of the echo cancellation quantity;
a foreground filter to perform a filtering operation using the new filter-coefficient group on the of input reception signal sequence to thereby generate an estimated echo component; and
a subtractor to subtract the estimated echo component from a voice-transmission signal input thereto from the sound collector, to thereby generate a residual signal.

2. The echo canceller device according to claim 1, further comprising a reception signal buffer to output, as a previous reception signal sequence, a reception signal sequence input thereto, after temporarily storing the reception signal sequence, wherein
the false echo calculator performs filtering operations using the current and previous filter-coefficient groups, respectively, on the previous reception signal sequence to thereby calculate the false echo signals.

3. The echo canceller device according to claim 1, wherein the filter selector selects, as the new filter-coefficient group, a filter-coefficient group corresponding to a largest one of the evaluated values of the echo cancellation quantity from among the current and previous filter-coefficient groups.

4. The echo canceller device according to claim 1, wherein the evaluation value calculator calculates, as each of the evaluated values of the echo cancellation quantity, a square of a ratio of the previous voice-transmission signal to a difference between the previous voice-transmission signal and each of the false echo signals.

5. The echo canceller device according to claim 1, wherein the foreground filter performs a filtering operation using only the new filter-coefficient group to thereby generate the estimated echo component.

6. The echo canceller device according to claim 1, wherein the foreground filter generates a combination filter-coefficient group by performing a linear combination of the new filter-coefficient group and a previous filter-coefficient group which has been used by the foreground filter, and also performs a filtering operation using the combination filter-coefficient group to thereby generate the estimated echo component.

7. A voice telecommunications device comprising:
a communication function unit to communicate with another voice telecommunications device via an electrical communication network; and
the echo canceller device according to claim 1 connected to both a speaker for converting into an acoustic wave a reception signal sequence input thereto from the communication function unit to emit the acoustic wave, and a sound collector, wherein
the echo canceller device reduces an acoustic echo component in a voice-transmission signal input thereto from the sound collector, using the reception signal sequence.

8. An echo canceller device comprising:
an adaptive filtering unit to perform a filtering operation using a filter-coefficient group on a reception signal sequence input thereto, and to adaptively update the filter-coefficient group on a basis of a voice-transmission signal input thereto from a sound collector;

a reception signal buffer to output, as a previous reception signal sequence, the input reception signal sequence, after temporarily storing the reception signal sequence;

a false echo calculator to acquire current and previous filter-coefficient groups which have been used by the adaptive filtering unit, and to perform a filtering operation using the current filter-coefficient group on the previous reception signal sequence to thereby calculate a first false echo signal, and further to perform a filtering operation using the previous filter-coefficient group on the previous reception signal sequence to thereby calculate a second false echo signal;

a voice-transmission signal buffer to output, as a previous voice-transmission signal, a voice-transmission signal input thereto from the sound collector, after temporarily storing the voice-transmission signal;

an evaluation value calculator to calculate a first evaluated value of an echo cancellation quantity on a basis of both the first false echo signal and the previous voice-transmission signal input thereto from the voice-transmission signal buffer, and to calculate a second evaluated value of the echo cancellation quantity on a basis of both the second false echo signal and the previous voice-transmission signal;

a double-talk detector to compare with each other the first and second evaluated values of the echo cancellation quantity to decide whether a double talk occurs;

a foreground filter to generating an estimated echo component by performing, on the input reception signal sequence, a filtering operation using a filter-coefficient group in which the current filter-coefficient group is incorporated with a degree of incorporation depending on the decision result acquired by the double-talk detector; and a subtractor to subtract the estimated echo component from a voice-transmission signal input thereto from the sound collector, to thereby generate a residual signal.

9. The echo canceller device according to claim 8, wherein, in a case where it is decided that the double talk has occurred, the foreground filter lower the degree of incorporation in comparison with that in a case where it is decided that no double talk has occurred.

10. The echo canceller device according to claim 8, wherein:

the false echo calculator calculates a third false echo signal by performing a filtering operation using the current filter-coefficient group on the input reception signal sequence, and calculates a fourth false echo signal by performing a filtering operation using the previous filter-coefficient group on the input reception signal sequence;

the evaluation value calculator calculates a third evaluated value of the echo cancellation quantity on a basis of both the third false echo signal and the voice-transmission signal input thereto from the sound collector, and calculates a fourth evaluated value of the echo cancellation quantity on a basis of both the fourth false echo signal and the voice-transmission signal input thereto from the sound collector; and the double-talk detector compares with each other the third and fourth evaluated values of the echo cancellation quantity to decide whether the double talk occurs.

11. The echo canceller device according to claim 10, wherein, the double-talk detector decides that the double talk has occurred, when the first evaluated value of the echo cancellation quantity is equal to or smaller than the second evaluated value of the echo cancellation quantity and the third evaluated value of the echo cancellation quantity is equal to or smaller than the fourth evaluated value of the echo cancellation quantity.

12. The echo canceller device according to claim 11, wherein the double-talk detector decides that an echo-path variation has occurred, when the first evaluated value of the echo cancellation quantity is equal to or smaller than the second evaluated value of the echo cancellation quantity and the third evaluated value of the echo cancellation quantity is larger than the fourth evaluated value of the echo cancellation quantity.

13. The echo canceller device according to claim 12, wherein the double-talk detector decides that an echo path is in a normal state, when the first evaluated value of the echo cancellation quantity is larger than the second evaluated value of the echo cancellation quantity.

14. The echo canceller device according to claim 8, further comprising a filter selector to select a new filter-coefficient group corresponding to the decision result acquired by the double-talk detector, from among the current and previous filter-coefficient groups, wherein the filter selector replaces the filter-coefficient group in the adaptive filtering unit with the new filter-coefficient group.

15. The echo canceller device according to claim 14, further comprising a filter coefficient buffer to temporarily store the current and previous filter-coefficient groups, wherein the filter coefficient buffer supplies the new filter-coefficient group to the adaptive filtering unit under control of the filter selector.

16. The echo canceller device according to claim 8, wherein the foreground filter generates a combination filter-coefficient group by performing a linear combination of a previous filter-coefficient group which has been used by the foreground filter, and the current filter-coefficient group which has been used by the adaptive filtering unit, and performs a filtering operation using the combination filter-coefficient group to thereby generate the estimated echo component.

17. The echo canceller device according to claim 8, further comprising a residual echo suppressor to suppress a residual echo component in the residual signal, wherein the residual echo suppressor adjusts a degree of suppression of the residual echo component in accordance with the decision result acquired by the double-talk detector.

18. A voice telecommunications device comprising:

a communication function unit to communicate with another voice telecommunications device via an electrical communication network; and the echo canceller device according to claim 8 connected to both a speaker for converting into an acoustic wave a reception signal sequence input thereto from the communication function unit to emit the acoustic wave, and a sound collector, wherein the echo canceller device reduces an acoustic echo component in a voice-transmission signal input thereto from the sound collector, using the reception signal sequence.

* * * * *